(12) United States Patent
Yamamoto et al.

(10) Patent No.: US 7,369,397 B2
(45) Date of Patent: May 6, 2008

(54) CAPACITOR DEVICE

(75) Inventors: Koichi Yamamoto, Utsunomiya (JP); Makoto Kawahara, Kawachi-gun (JP); Naoyuki Abe, Haga-gun (JP); Masaru Imai, Fukuroi (JP); Kiyotaka Hanaoka, Shimada (JP)

(73) Assignee: Honda Motor Co., Ltd., Tokyo (JP)

( * ) Notice: Subject to any disclaimer, the term of this patent is extended or adjusted under 35 U.S.C. 154(b) by 99 days.

(21) Appl. No.: 11/433,774

(22) Filed: May 15, 2006

(65) Prior Publication Data

US 2006/0262482 A1    Nov. 23, 2006

(30) Foreign Application Priority Data

May 17, 2005   (JP)   ............................ P2005-144493

(51) Int. Cl.
*H01G 5/38*   (2006.01)
*H01G 9/00*   (2006.01)

(52) U.S. Cl. ...................... 361/329; 361/541; 361/522
(58) Field of Classification Search ........ 361/328–330, 361/541, 522
See application file for complete search history.

(56) References Cited

U.S. PATENT DOCUMENTS

| | | | | |
|---|---|---|---|---|
| 1,821,803 A | * | 9/1931 | Haefely | 361/329 |
| 4,677,523 A | * | 6/1987 | Kauppi | 361/329 |
| 5,367,437 A | * | 11/1994 | Anderson | 361/807 |

FOREIGN PATENT DOCUMENTS

JP            7-33370 Y2       7/1995

* cited by examiner

*Primary Examiner*—Eric Thomas
(74) *Attorney, Agent, or Firm*—Arent Fox, PLLC

(57) ABSTRACT

The present invention provides a capacitor device including a plurality of capacitor elements adjacent to each other along an axial direction are electrically connected to each other by fitting between a first terminal of one capacitor element and a second terminal of the other capacitor element, a intermediate plate allows the terminals fitted to each other between the capacitor elements adjacent to each other along the axial direction to penetrate through and positions these capacitor elements, an upper plate is electrically connected to the terminals of capacitor elements arranged on one end portion in the axial direction, a lower plate is electrically connected to the terminals of capacitor elements arranged on the other end portion in the axial direction, and all the capacitor elements are held in place by being sandwiched between the upper plate and the lower plate.

3 Claims, 35 Drawing Sheets

CAPACITOR DEVICE

This application claims the priority of Japanese Patent Application No. 2005-144493, filed May 17, 2005, the content of which is incorporated in its entirety by reference herein.

BACKGROUND OF THE INVENTION

1. Field of the Invention

The present invention relates to a capacitor device constructed by electrically connecting a plurality of capacitor elements.

2. Description of Related Art

Techniques for constructing capacitor devices with desired voltages by connecting a number of capacitor elements in series are conventionally known.

For example, Japanese Examined Utility Model Application, Second Publication No. H07-33370 discloses a technique in which terminals whose poles are different from each other are provided on surfaces adjacent to each other of rectangular parallelepiped storage batteries and connected to each other to unite the batteries into one capacitor device.

However, in the conventional capacitor device, the storage batteries are electrically and mechanically connected to each other only by the connection between the terminals, so that the relative positional relationship among the storage batteries is easily altered, and therefore, the capacitor device easily becomes distorted. In order to prevent such distortion of the capacitor device, it is also considered preferable that the entire capacitor device be housed in a casing, however, in this case, the capacitor device increases in size and weight.

SUMMARY OF THE INVENTION

Therefore, the present invention provides a capacitor device which can be stabilized in shape, downsized and reduced in weight while it is formed by an aggregate of a number of capacitor elements.

A capacitor device of the present invention includes: a plurality of capacitor elements, each of which has a first terminal on one end side and a second terminal on the other end side in an axial direction, and which are plurally arranged along the axial direction and plurally arranged along a direction crossing the axial direction; an upper plate disposed so as to be joined to one end portion in the axial direction of each of the plurality of capacitor elements arranged along the axial direction; a lower plate disposed so as to be joined to the other end portion in the axial direction of each of the plurality of capacitor elements arranged along the axial direction; and an intermediate plate disposed between the capacitor elements adjacent to each other along the axial direction, wherein the capacitor elements adjacent to each other along the axial direction are electrically connected to each other by fitting between the first terminal of one capacitor element and the second terminal of the other capacitor element, the intermediate plate allows the terminals fitted to each other between the capacitor elements adjacent to each other along the axial direction to penetrate through and positions these capacitor elements, the upper plate is electrically connected to the first terminals or the second terminals of the capacitor elements arranged on one end portion in the axial direction, the lower plate is electrically connected to the first terminals or the second terminals of the capacitor elements arranged on the other end portion in the axial direction, and all of the plurality of capacitor elements are held in place by being sandwiched between the upper plate and the lower plate.

With this construction, the capacitor elements adjacent to each other along the axial direction are positioned by the intermediate plate, so that the relative positional relationship among the capacitor elements is not altered, and the entire form of the capacitor device is stabilized. In addition, all capacitor elements are held by being sandwiched between the upper plate and the lower plate, so that the capacitor device can be reduced in size and weight.

It is preferable that on the upper plate and the lower plate, connecting members that electrically connect the capacitor elements adjacent to each other are provided, whereby all the capacitor elements are connected in series.

With this construction, the high-voltage capacitor device can be constructed so as to be small in size and light in weight.

Furthermore, it is also preferable that on the intermediate plate, voltage detecting terminals to be connected to the terminals that penetrate the intermediate plate and are fitted to each other are provided.

With this construction, the capacitor device can be handled as a plurality of units and the voltages of the respective units can be detected.

According to the capacitor device of the invention, the relative positional relationship among the capacitor elements is not altered, so that the entire form of the capacitor device is stabilized. In addition, the capacitor device can be made so as to be small in size and light in weight.

Furthermore, a high-voltage capacitor device can be constructed so as to be small in size and light in weight.

Furthermore, the capacitor device can be handled as a plurality of units and the voltages of the respective units can be detected, so that a precise voltage control of the capacitor device can be achieved.

DETAILED DESCRIPTION OF THE INVENTION

Hereinafter, preferred embodiments of a capacitor device according to the present invention will be described with reference to FIG. 1 through FIG. 37.

First Embodiment

A first embodiment of the capacitor device according to the present invention will be described with reference to FIG. 1 through FIG. 19.

Figure 1:
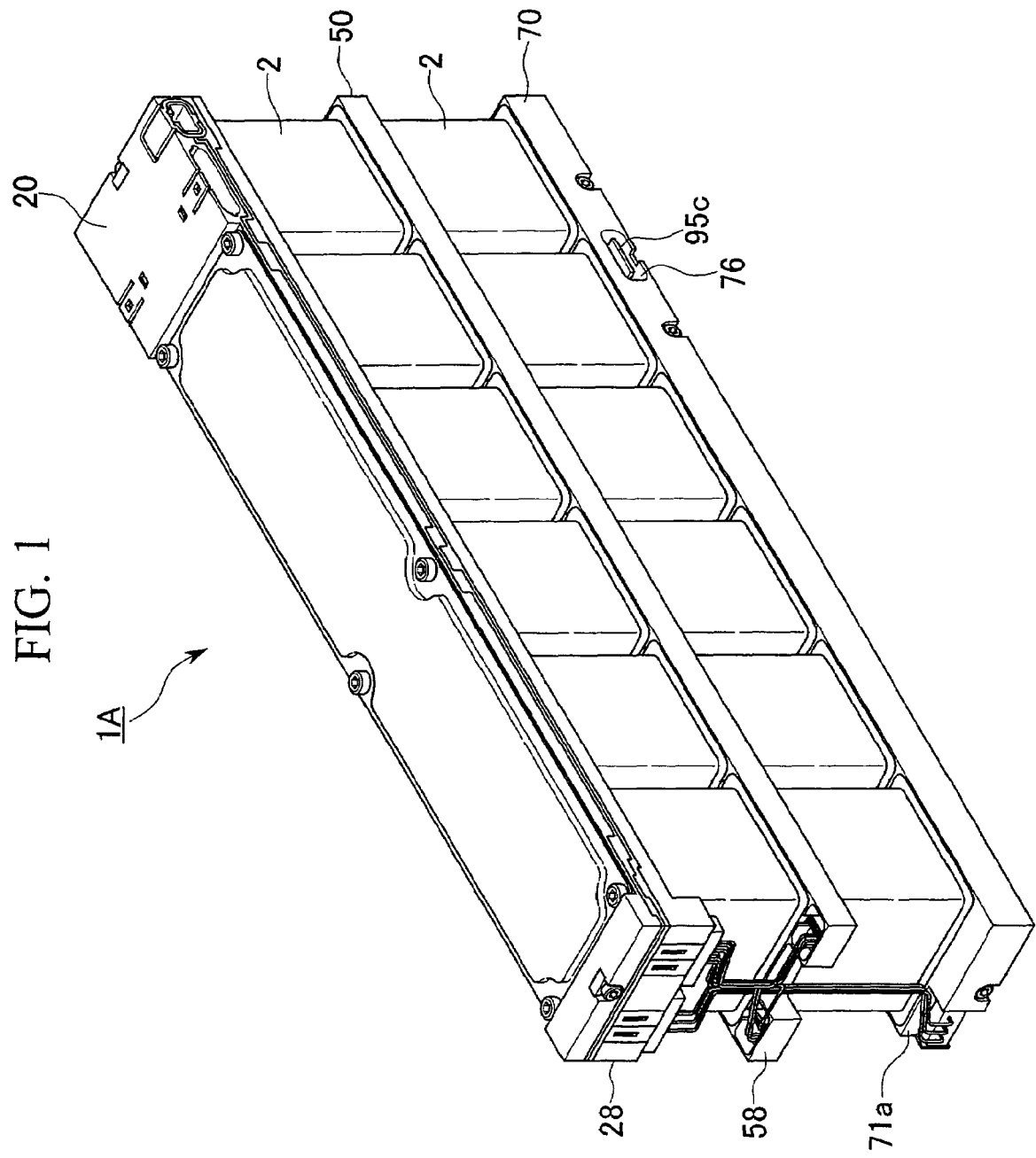
FIG. 1 is an external perspective view of a capacitor device according to a first embodiment of the invention.

FIG. 1 is an external perspective view of a capacitor device 1A of the first embodiment, and in the capacitor device 1A, between an upper plate 20 and a lower plate 70, twelve capacitors 2, 2 . . . as twelve capacitor elements are sandwiched and held. The capacitors 2, 2 . . . are arranged on two upper and lower stages, and each stage includes six capacitors, and between the six capacitors 2, 2 . . . on the upper stage and the six capacitors 2, 2 . . . on the lower stage, an intermediate plate 50 is disposed.

Figure 2A:
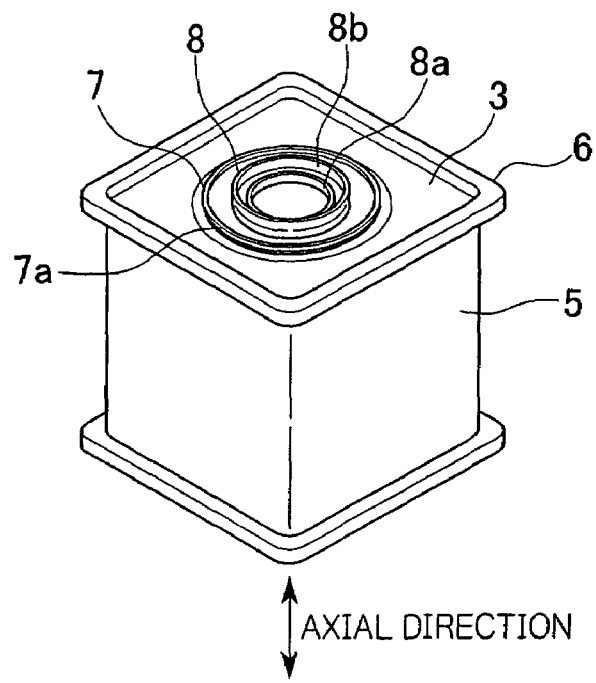
FIG. 2A is an external perspective view of a capacitor in the capacitor device.
Figure 2B:
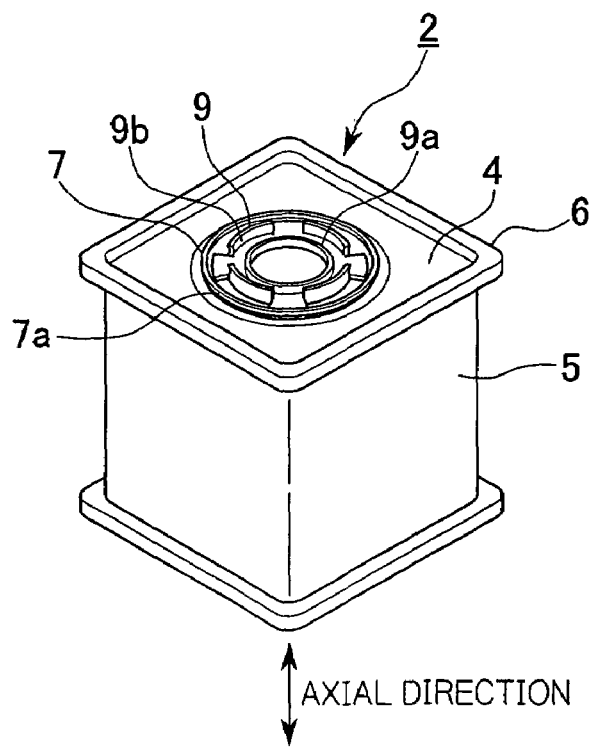
FIG. 2B is an external perspective view of the capacitor shown in FIG. 2A from the reverse side.

First, the capacitor 2 will be described. As shown in FIG. 2A and FIG. 2B, the capacitor 2 is roughly shaped into a rectangular parallelepiped, and has a bottom plate 3 and a top plate 4 positioned opposite each other and a side plate 5 connecting these, and between the bottom plate 3 and the side plate 5 and between the top plate 4 and the side plate 5, rectangular frame portions 6 projecting outward are formed.

As shown in FIG. 2A, to the center of the bottom plate 3, a dish member 7 and a positive terminal body 8 are concentrically attached, and as shown in FIG. 2B, to the center of the top plate 4, the dish member 7 and a negative terminal body 9 are concentrically attached. Hereinafter, a direction in which the positive terminal body 8 and the negative terminal body 9 face each other, that is, an axial direction that connects the center of the bottom plate 3 and the center of the top plate 4 is referred to as an axial direction of the capacitor 2. Therefore, the axial direction of the capacitor 2 is determined according to the positions of the positive terminal (first terminal) and the negative terminal (second terminal), and this has no relation to the internal structure of the capacitor 2. The top plate 4 and the bottom plate 3 do not always mean the upper side and the lower side in an installed state, and for example, it is also possible for the top plate 4 to be set on the lower side and the bottom plate 3 to be set on the upper side.

Figure 19:
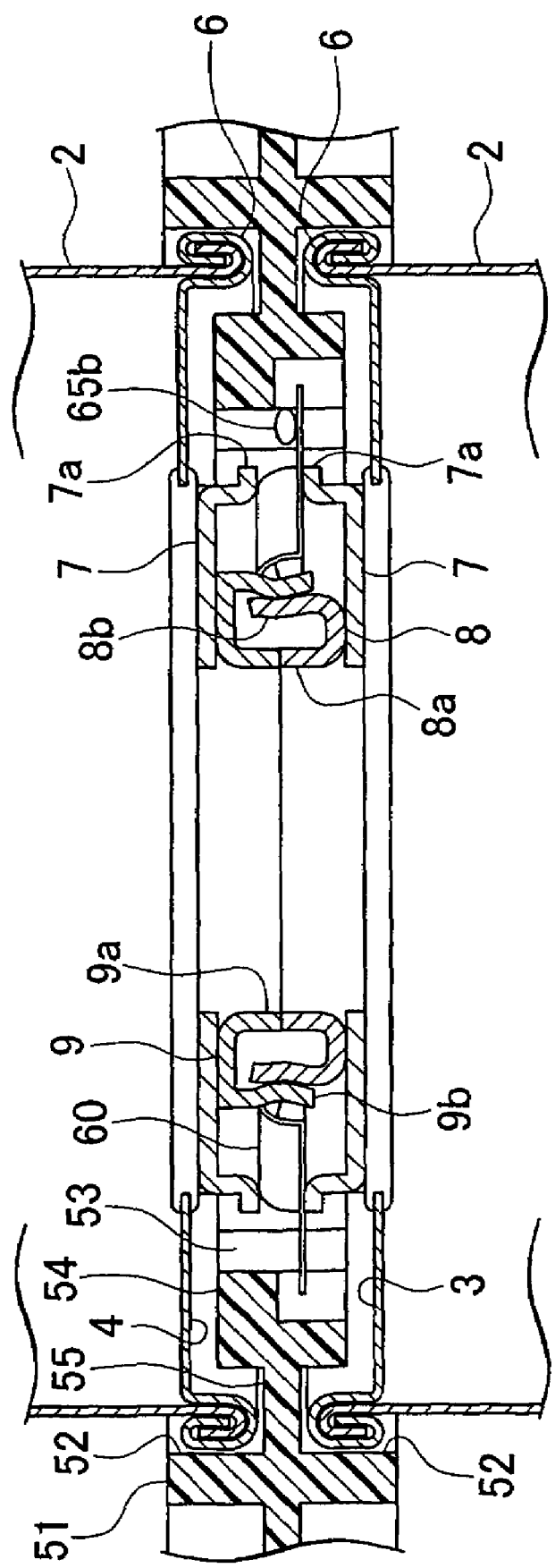
FIG. 19 is a sectional view showing a state in which two capacitors are directly connected across the intermediate plate.

The dish member 7, the positive terminal body 8, and the negative terminal body 9 are all made of a conductive metal (for example, copper), and the positive terminal 8 or the negative terminal body 9 is screwed onto the dish member 7. As shown in FIG. 19, the dish member 7 provided on the bottom plate 3 and the dish member 7 provided on the top plate 4 are in circular dish shapes with the same shape and the same dimensions, and on the upper ends thereof, annular flanges 7a expanding horizontally outward are formed.

The positive terminal body 8 is smaller in diameter than the flange 7a, and at the center thereof, a cylindrical positioning projection 8a is provided, and to the outer side of the positioning projection 8a, a roughly cylindrical positive terminal (first terminal) 8b is continuously provided. On the bottom plate 3, the flange 7a of the dish member 7 is positioned at almost the same height as that of the tip end of the frame portion 6, and the tip end of the positioning projection 8a projects outward in the axial direction of the capacitor 2 more than the tip end of the frame portion 6, and the tip end of the positive terminal 8b projects outward in the axial direction of the capacitor 2 more than the tip end of the positioning projection 8a.

The negative terminal body 9 is smaller in diameter than the flange 7a of the dish member 7, and at the center thereof, a cylindrical positioning projection 9a is provided, and a negative terminal (second terminal) 9b is continuously provided to the outer side of the positioning projection 9a. The positioning projection 9a on the negative terminal body 9 has the same shape and the same dimensions as those of the positioning projection 8a of the positive terminal body 8, and the negative terminal 9b is divided into a plurality of segments (four in this embodiment) circumferentially arranged on a virtual circumference. On the top plate 4, the flange 7a of the dish member 7 is set at almost the same height as that of the tip end of the frame portion 6, the tip end of the positioning projection 9a projects outward in the axial direction of the capacitor 2 more than the tip end of the frame portion 6, and the tip end of the negative terminal 9b projects outward in the axial direction of the capacitor 2 more than the tip end of the positioning projection 9a.

In the case of the capacitor 2 thus constructed, two of the capacitors 2 and 2 can be directly connected along the axial direction. This connection between the capacitors 2 and 2 is made by fitting, in the inner side of the negative terminal 9b of one capacitor 2, the positive terminal 8b of the other capacitor 2 as shown in FIG. 19, and the position at which the tip ends of the positioning projections 8a and 9a of the capacitors 2 and 2 are butted against each other is defined as a fitting complete point, and is set so that, in this state, the flanges 7a and 7a of the dish members 7 and 7 of the capacitors 2 and 2 are positioned at a predetermined distance from each other. The same-pole terminals of the capacitors 2 and 2 cannot be directly connected, and therefore, direct connection of the capacitors 2 and 2 to each other electrically means serial connection. The positioning projections 8a and 9a perform positioning in the axial direction when the capacitors 2 and 2 are directly connected.

Figure 3:
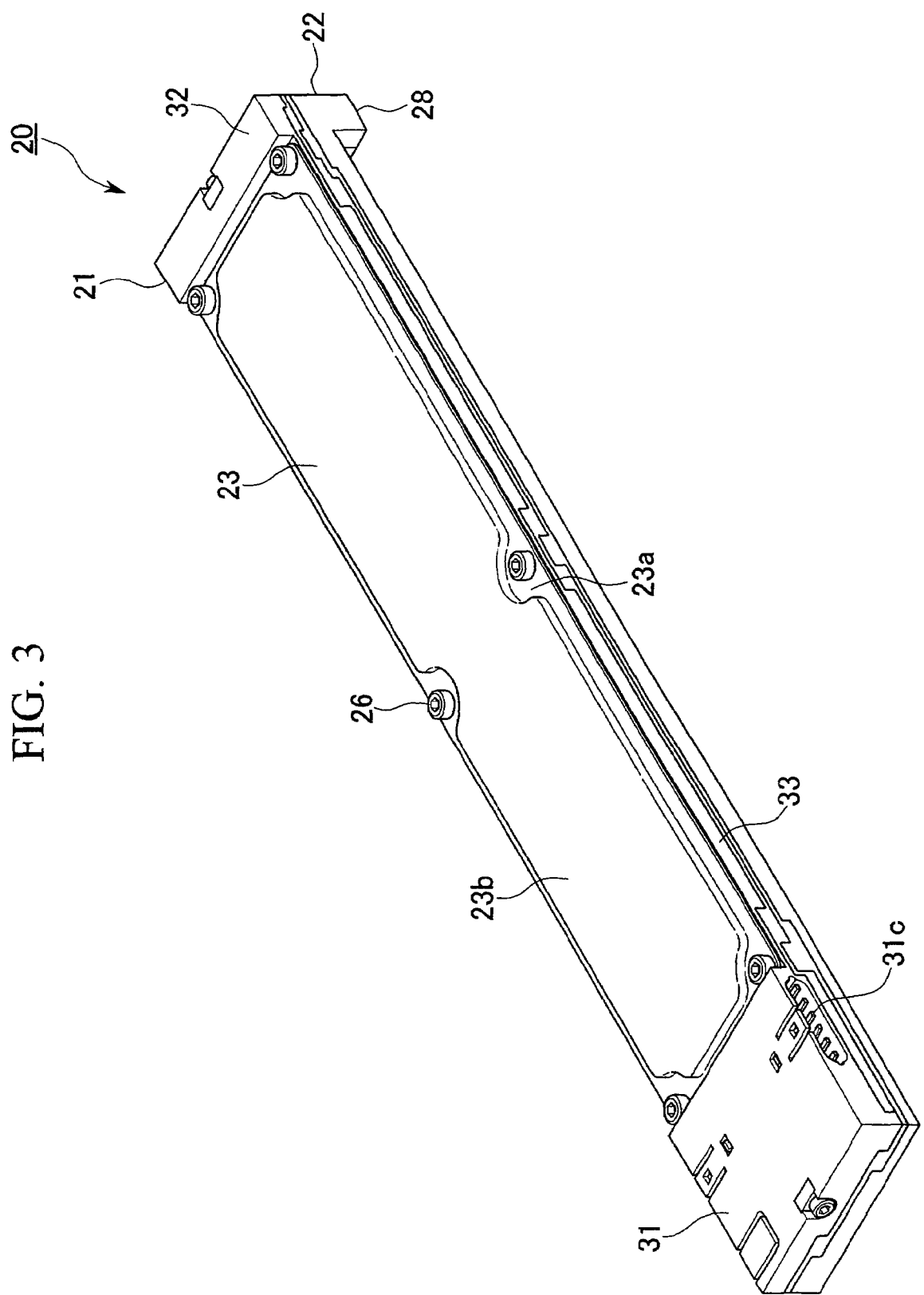
FIG. 3 is an external perspective view of an upper plate in the capacitor device.
Figure 4:
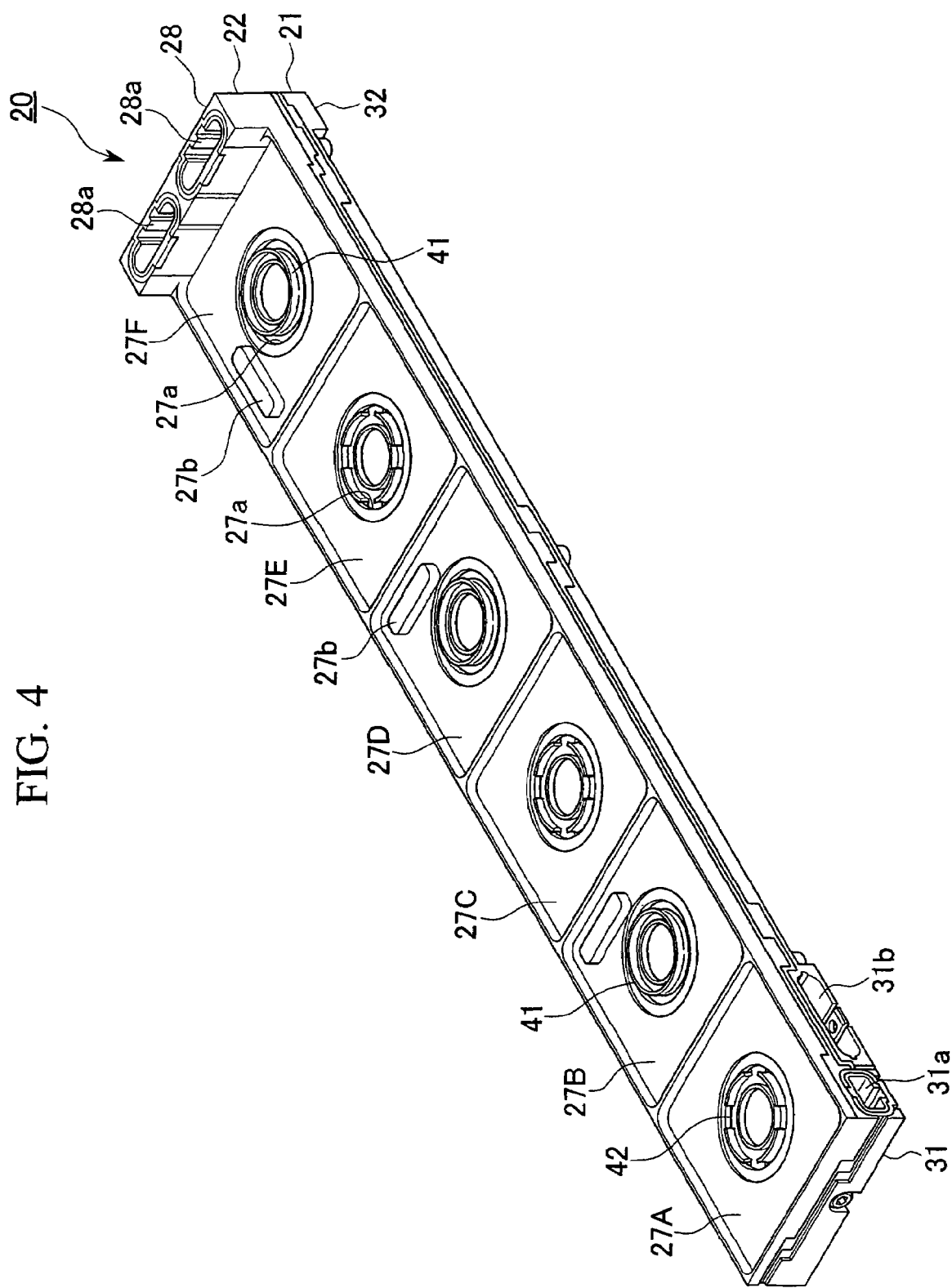
FIG. 4 is an external perspective view of the upper plate shown in FIG. 3 from the reverse side.
Figure 5:
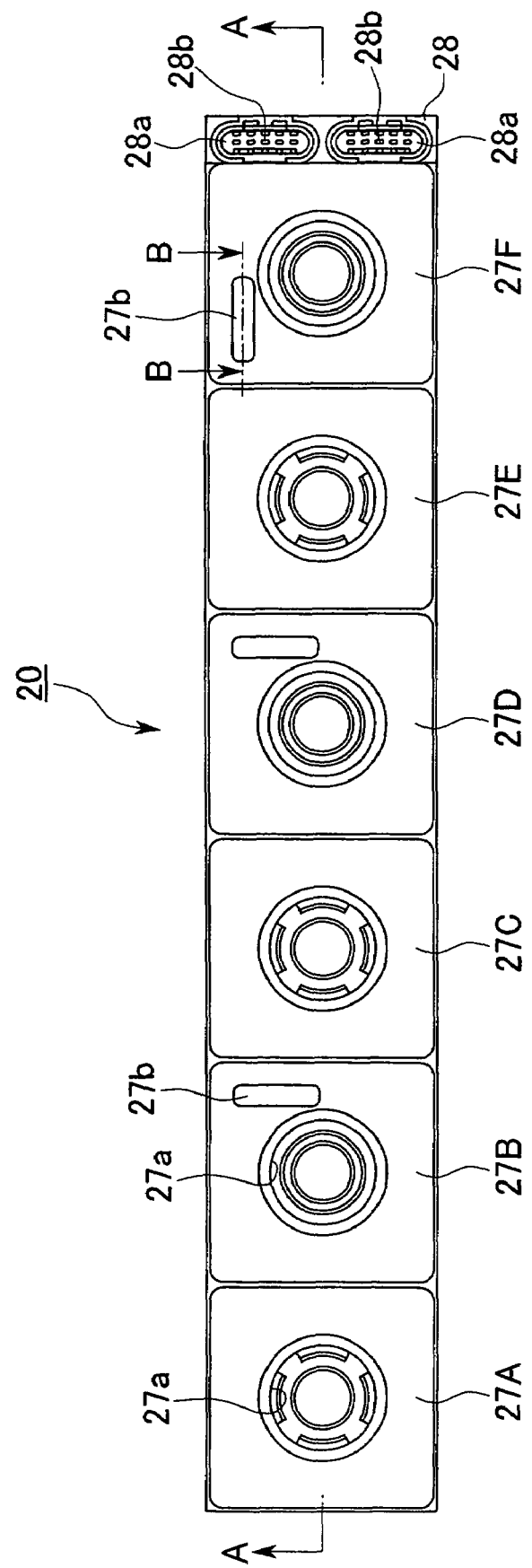
FIG. 5 is a bottom view of the upper plate shown in FIG. 4.
Figure 6:
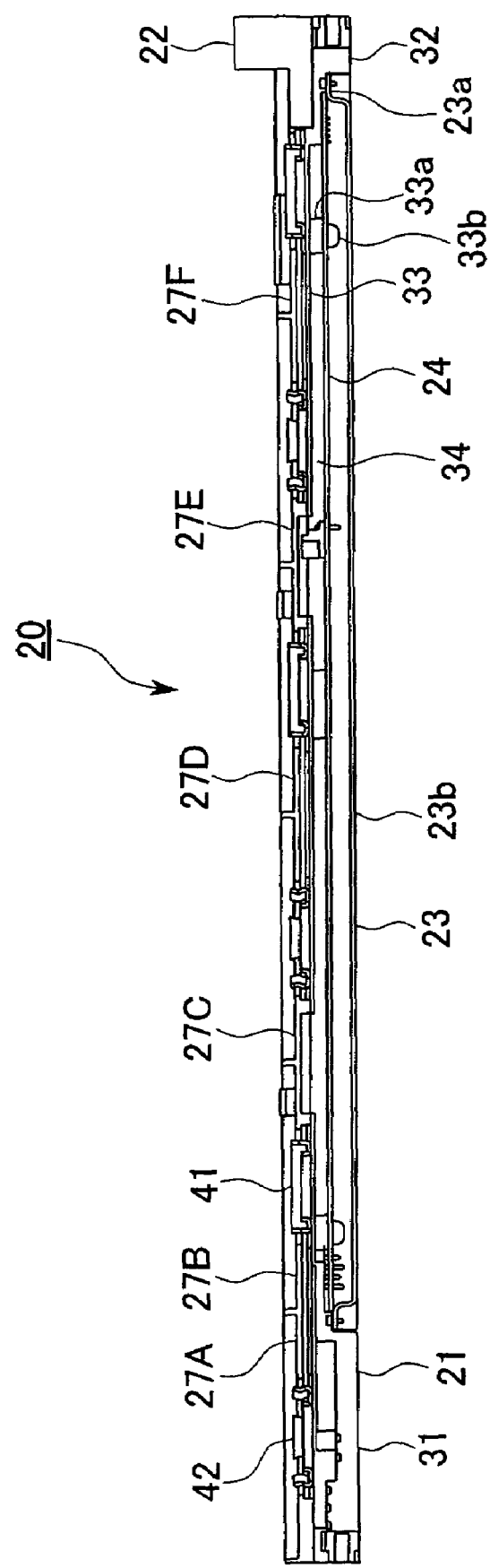
FIG. 6 is a sectional view taken along the line A-A of FIG. 5.
Figure 7:
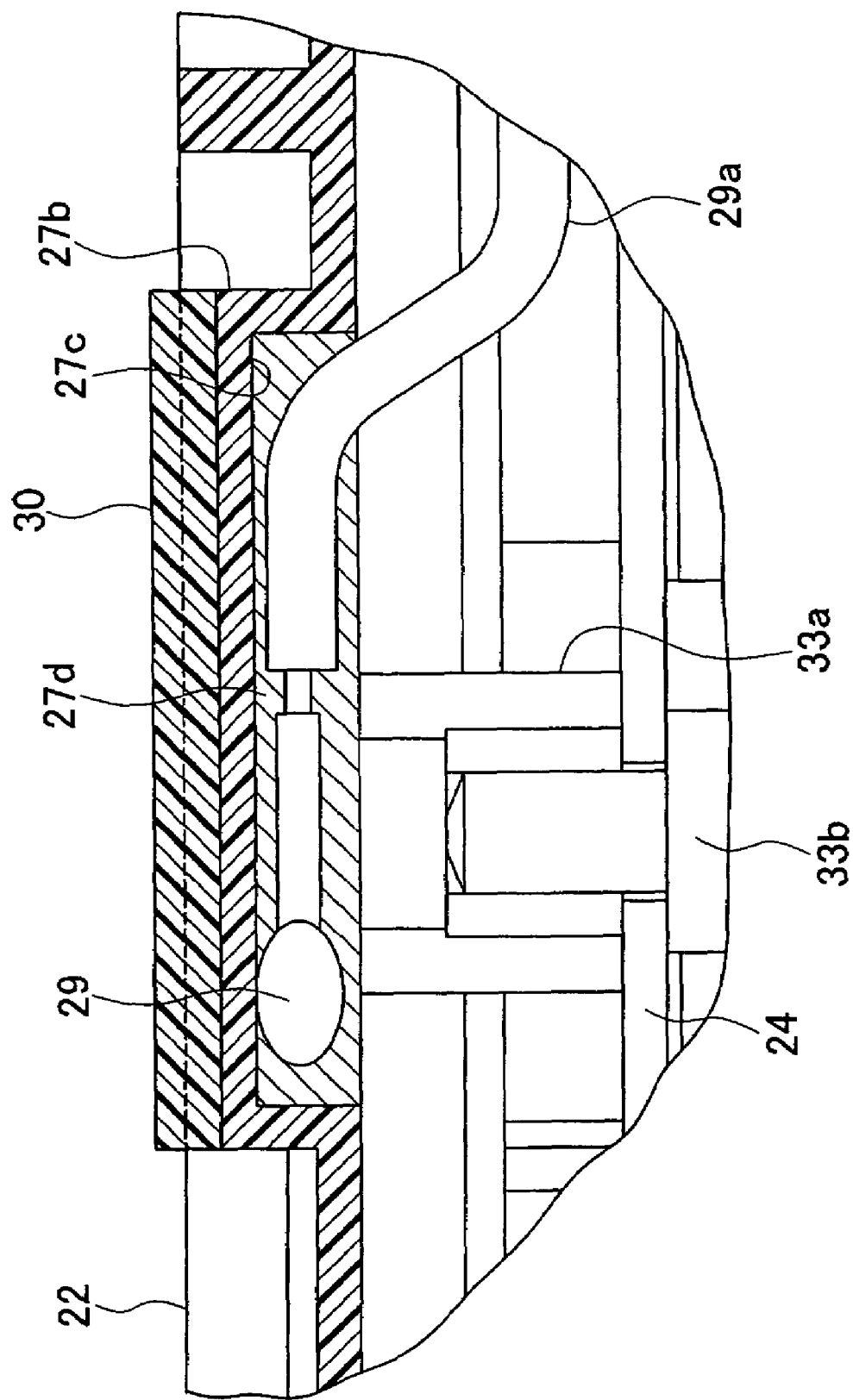
FIG. 7 is a sectional view taken along the line B-B of FIG. 5.
Figure 8:
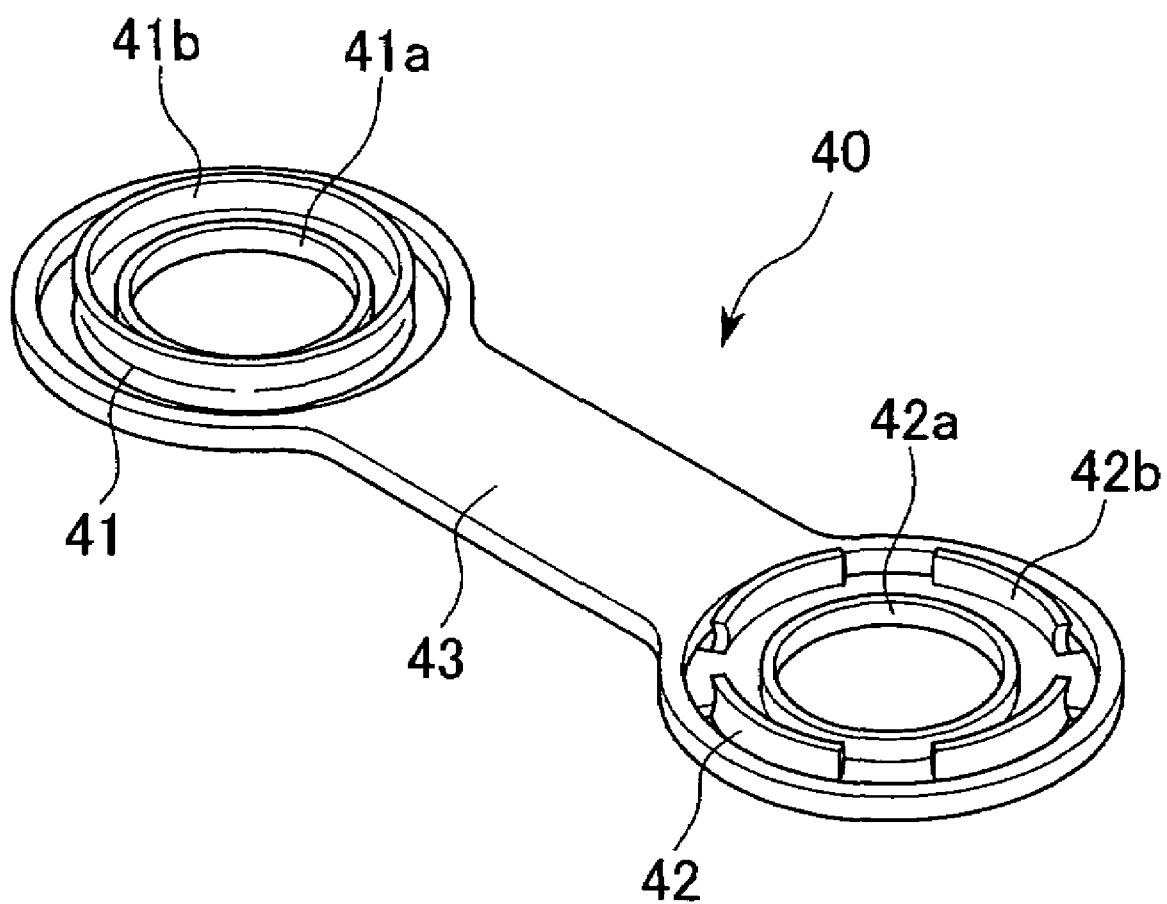
FIG. 8 is an external perspective view of a bus bar of the upper plate in the first embodiment.

Next, the upper plate will be described in FIGS. 3-8, wherein FIG. 3 is an external perspective view of the upper plate, FIG. 4 is an external perspective view of the upper plate 20 from the reverse side, FIG. 5 is a bottom view of the upper plate 20, FIG. 6 is a sectional view taken along the line A-A of FIG. 5, FIG. 7 is a sectional view taken along the line B-B of FIG. 5, and FIG. 8 is an external perspective view of a bus bar that is described later.

The upper plate 20 has a roughly rectangular plate shape in plan view, and mainly includes a first frame 21 and a second frame 22 made of a resin, a cover 23 made of a metal, a control board 24 including circuits (a capacitor voltage detecting circuit and a capacitor temperature control circuit) for monitoring the voltage and temperature, etc., of each capacitor 2, and three bus bars (connecting members) 40 for connecting the positive terminal 8b and the negative terminal 9b of the two capacitors 2 and 2 adjacent to each other. The first frame 21 is disposed on the second frame 22, the cover 23 is disposed on the first frame 21, and the cover 23, the first frame 21, and the second frame 22 are connected and fixed together by six bolts attached from the cover 23 side.

The bus bar 40 is made of a conductive metal (for example, copper), and as shown in FIG. 8, includes a male terminal body 41 and a female terminal body 42 formed so as to have the same shapes and the same dimensions as those of the positive terminal body 8 and the negative terminal body 9 of the capacitor 2, and a connecting plate 43 that connects these male terminal body 41 and female terminal body 42. The mail terminal body 41 has a projection 42a and a male terminal 41b corresponding to the projection 8a and the positive terminal 8b of the positive terminal body 8, and the female terminal body 42 has a projection 42a and a female terminal 42b corresponding to the projection 9a and the negative terminal 9b of the negative terminal body. The male terminal body 41 is welded to one end of the connecting plate 43 and the female terminal body 42 is welded to the other end of the connecting plate 43. The dimension between the centers of the male terminal 41b and the female terminal 42b matches the dimension between the centers of the positive terminal 8b and the negative terminal 9b of the two capacitors 2 and 2 that are connected to the male terminal 41b and the female terminal 42b and arranged in parallel to each other.

On the bottom surface of the second frame 22, i.e., one end side in the longitudinal direction thereof, a connector portion 28 having two connector insertion ports 28a and 28a is projectedly provided in a direction separate from the first frame 21 (downward). Pin connectors 28b (see FIG. 5) provided inside the connector insertion ports 28a are connected to the capacitor voltage detecting circuit of the control board 24.

On the bottom surface of the second frame 22, six concave portions 27A through 27F (hereinafter, referred to as concave portions 27 when it is not necessary to distinguish the individual concave portions) having rectangular shapes in plan view are arranged in a vertical row along the longitudinal direction of the second frame 22. The concave portions 27 are for inserting the frame portions 6 of the capacitors 2 and positioning the capacitors 2, and are formed into a size slightly larger than the frame portions 6. In the second frame 22, at the centers of the respective concave portions 27, circular holes 27a are formed. The holes 27a are for exposing the male terminal body 41 and the female terminal body 42 of the bus bar 40 from the second frame 22, and the inner diameter of the holes 27a is set to be slightly larger than the outer diameter of the female terminal 42b.

Furthermore, on the second frame 22, at predetermined positions of the second, fourth, and sixth concave portions 27B, 27D, and 27F from the side furthest from the connector portion 28, convex portions 27b projecting in a direction separate from the first frame 21 (downward) are formed. As shown in FIG. 7, in a groove 27c on the inner side of the convex portion 27b, a thermistor 29 for detecting the temperature of the capacitor 2 is disposed in close contact with the second frame 22, and the thermistor 29 is fixed by silicone 27d filled in the groove 27c and electrically connected to the capacitor temperature control circuit of the control board 24 via a lead wire 29a. To the surface of the convex portion 27b, a gel resin sheet 30 with high heat conductance is attached.

The three bus bars 40 are arranged between the first frame 21 and the second frame 22 and fixed to the second frame 22 by projecting the tip ends of the male terminal bodies 41 and the female terminal bodies 42 from the holes 27a of the second frame 22, and these bus bars 40 are electrically connected to the capacitor voltage detecting circuit of the control board 24. The male terminal body 41 and the female terminal body 42 are alternately arranged, and in this first embodiment, at a position closest to the connector portion 28, the male terminal body 41 is disposed.

Both of ends 31 and 32 in the longitudinal direction of the upper surface of the first frame 21 are set one stage higher than its central portion 33, and in both side surfaces of an end portion disposed opposite the connector portion 28 of the second frame 22, three connector insertion ports 31a, 31b, and 31c are provided. Pin connectors (not shown) provided inside these connector insertion ports 31a, 31b, and 31c are connected to the control board 24.

At the central portion 33 of the upper surface of the first frame 21, a plurality of bosses 33a for attaching a board are projectedly provided in a direction separate from the second frame 22 (upward), and the control board 24 is arranged on these bosses 33a and fixed to the bosses 33a by screws 33b. To this control board 24, a number of electronic parts (not shown) are attached, and all of the electronic parts are mounted by being turned toward the upper surface side of the first frame 21. Namely, these electronic parts are accommodated within a space created between the control board 24 and the first frame 21, and are not attached to the side higher than the control board (side separating from the first frame 21). By mounting the control board 24 by thus arranging the electronic parts, the height of the upper plate can be shortened.

The cover 23 is attached onto the central portion 33 of the first frame 21 so as to surround this control board 24. The cover 23 has a hat-shaped section, and a flat rim portion 23a formed on the outer periphery is fixed to the central portion 33 by bolts 26, and its top plate 23b is set at a height almost equal to the height of the upper surfaces of both ends 31 and 32 of the first frame 21. The screw portion of the bolt 26 penetrates the cover 23 and the first frame 21 and is screwed into the second frame 22, whereby the cover 23, the first frame 21, and the second frame 22 are joined together.

Figure 9:
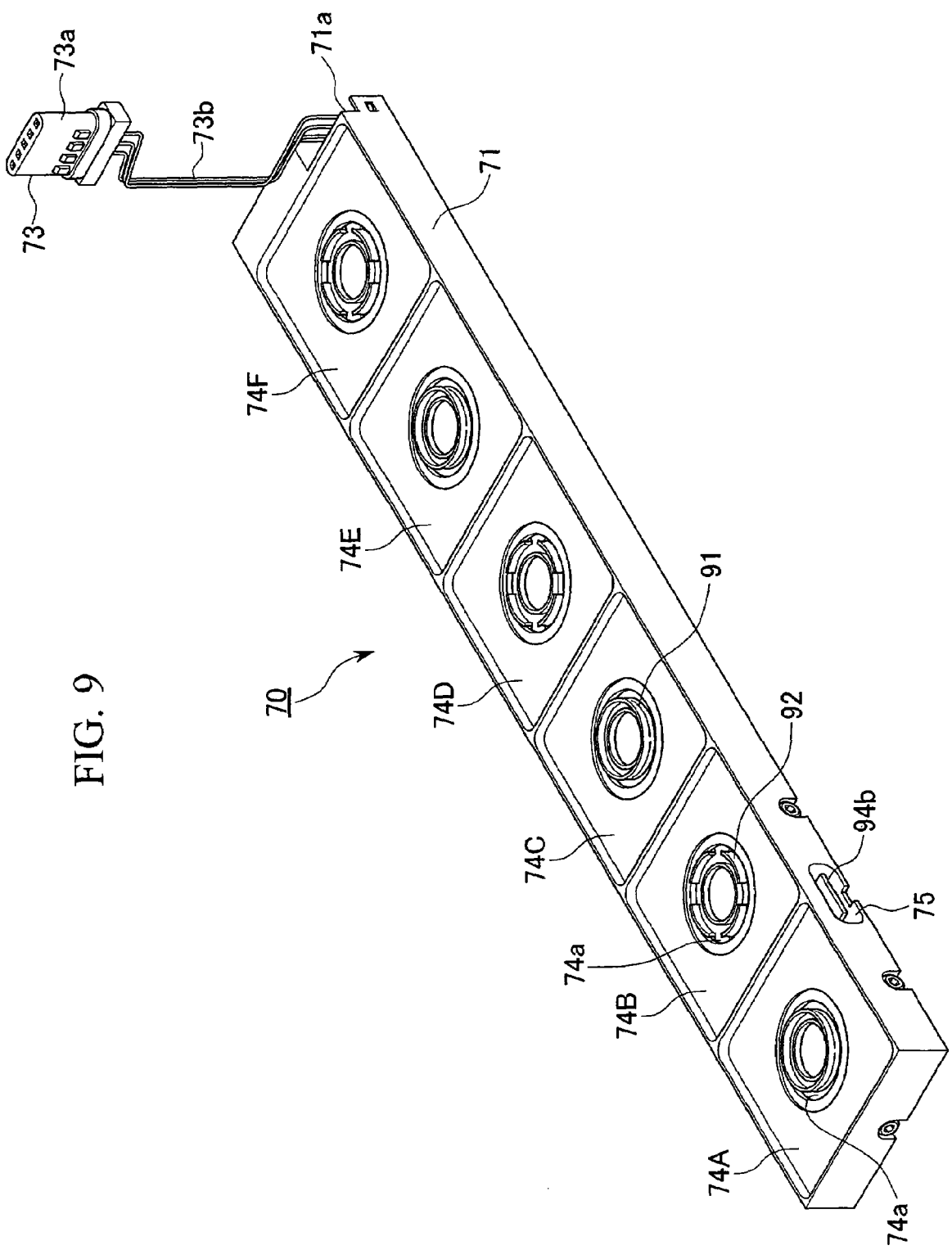
FIG. 9 is an external perspective view of a lower plate in the capacitor device.
Figure 10:
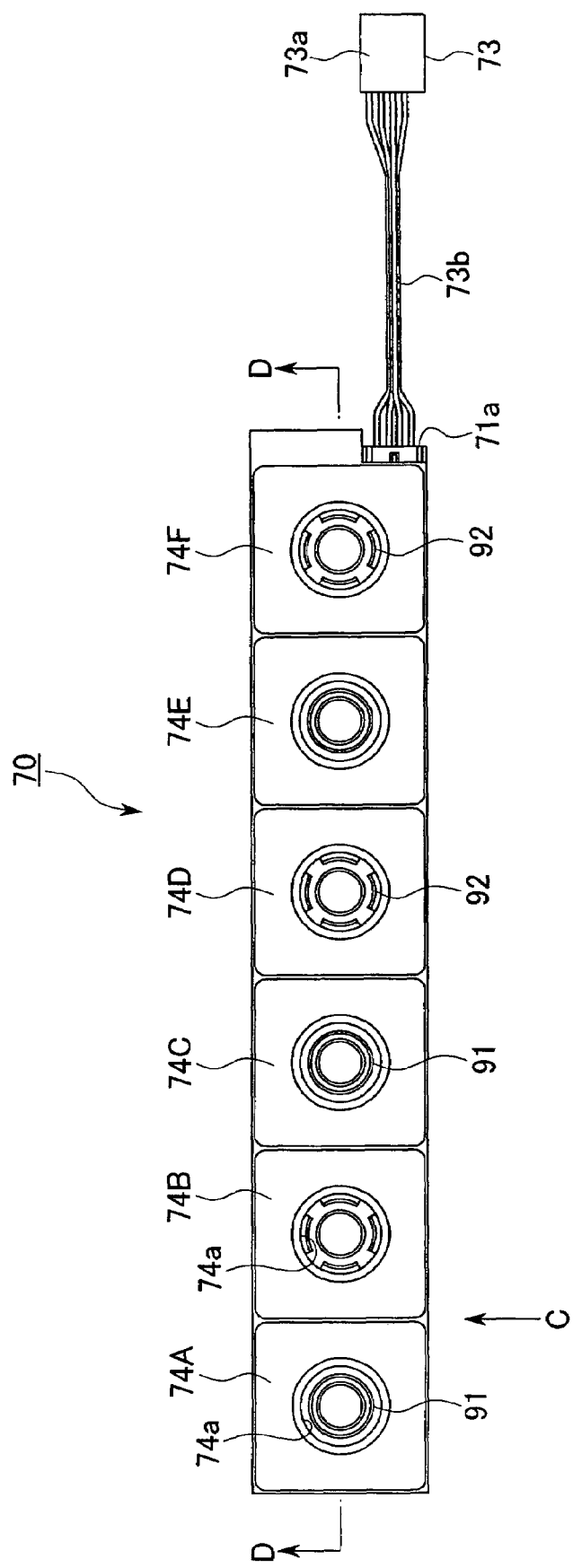
FIG. 10 is a plan view of the lower plate shown in FIG. 9.
Figure 11:
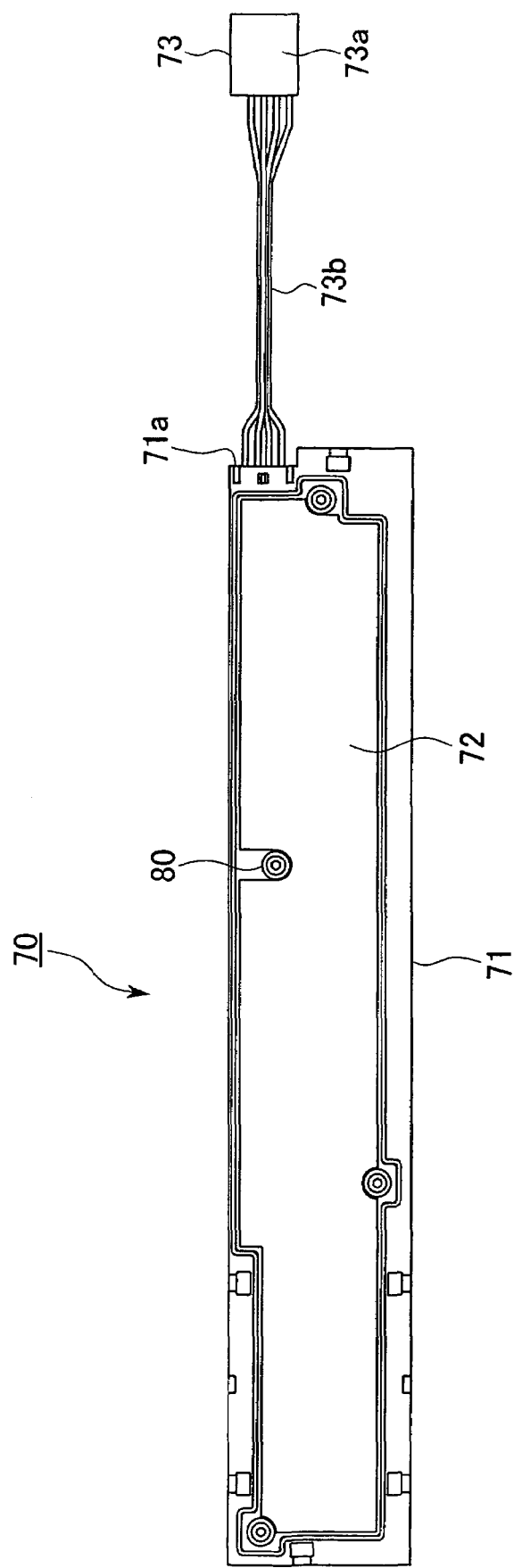
FIG. 11 is a bottom view of the lower plate shown in FIG. 9.
Figure 12:
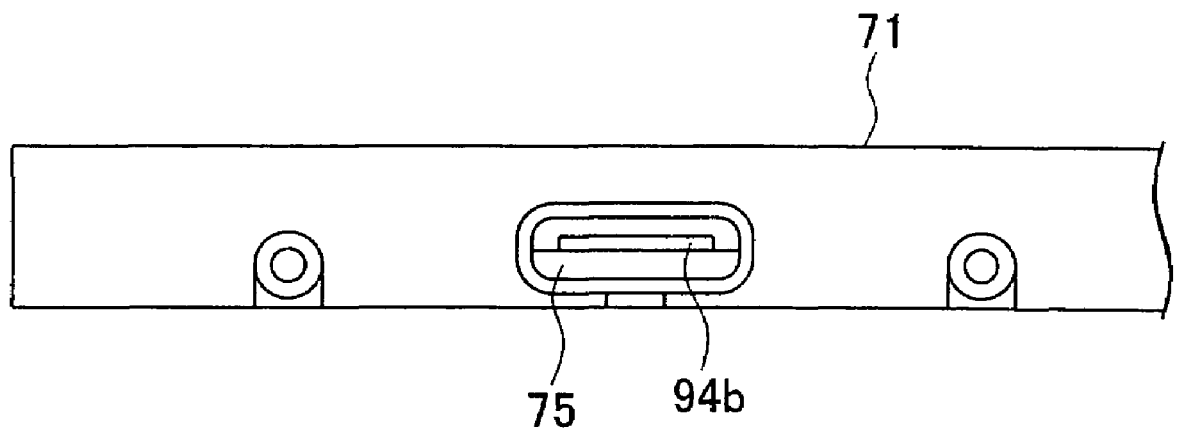
FIG. 12 is a side view along the arrow C of FIG. 10.
Figure 13:
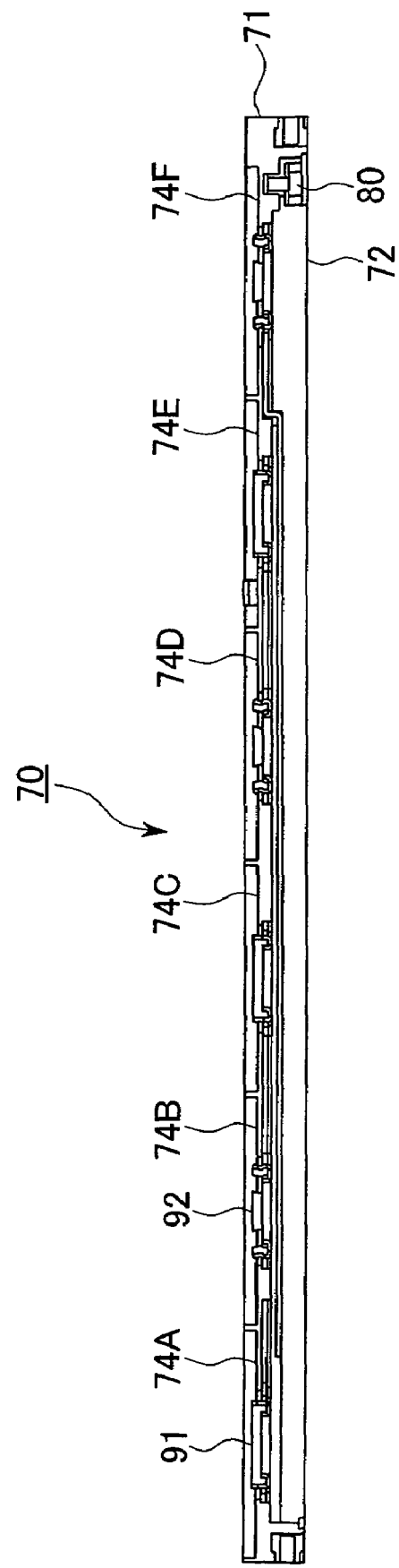
FIG. 13 is a sectional view taken along the line D-D of FIG. 10.
Figure 14:
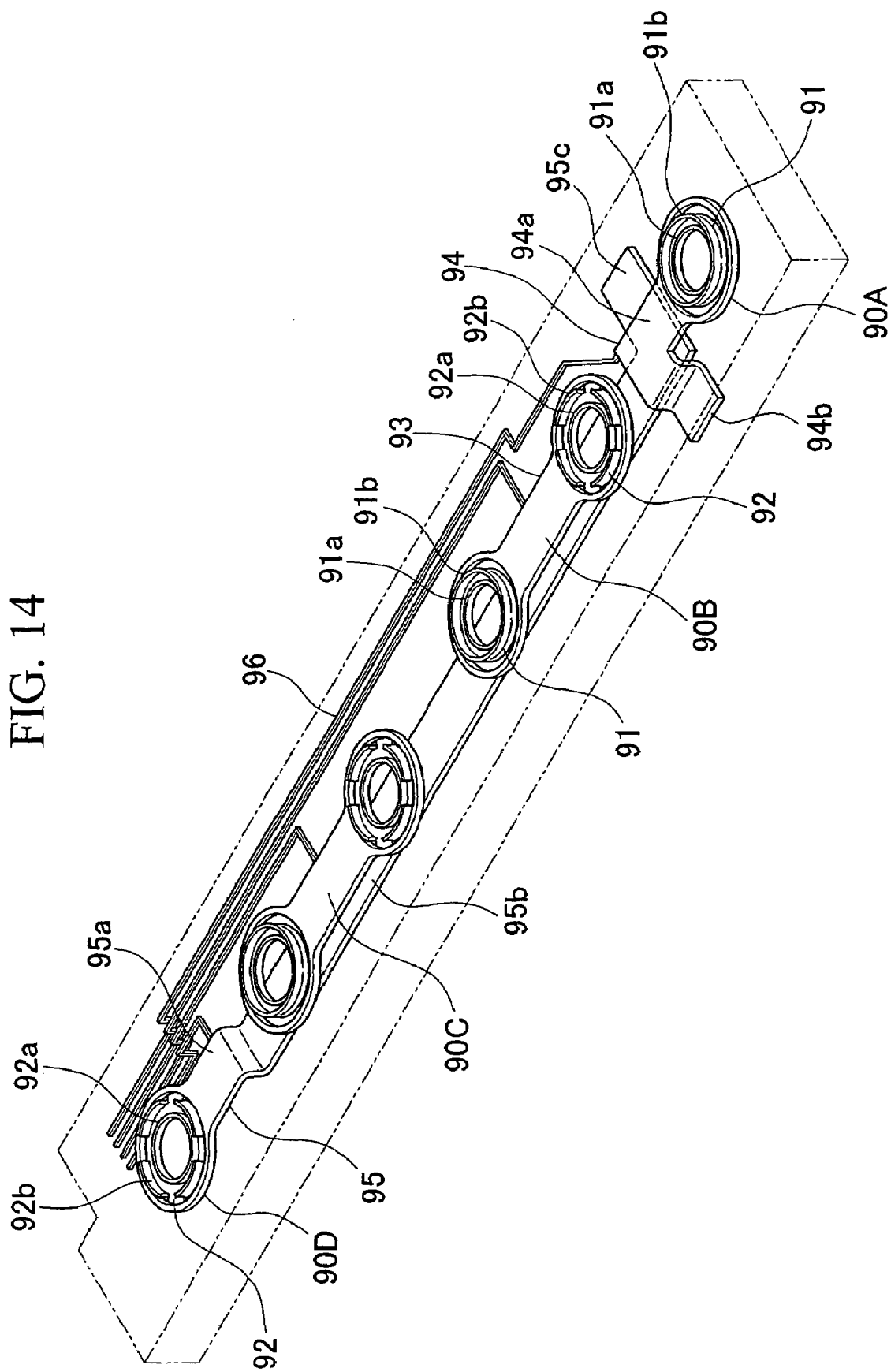
FIG. 14 is a perspective view showing a relative positional relationship of bus bars of the lower plate.

Next, the lower plate 70 will be described in FIGS. 9-14, in which FIG. 9 is an external perspective view of the lower plate 70, FIG. 10 is a plan view of the lower plate 70, FIG. 11 is a bottom view of the lower plate 70, FIG. 12 is a side view in the direction of the arrow C of FIG. 10, FIG. 13 is a sectional view taken along the line D-D of FIG. 10, and FIG. 14 is a perspective view showing the relative positional relationship of bus bars (connecting members) 90A through 900 described later.

The lower plate 70 is plate-shaped member with a roughly rectangular shape in plan view, and mainly includes a first frame 71 and a second frame 72 made of a resin, a connector 73, and the four bus bars 90A, 90B, 900, and 900 made of a conductive metal (for example, copper). The second frame 72 fitted to the bottom of the first frame 71 is fixed to the first frame 71 with four bolts 80, and the bus bars 90A through 90D are attached between the first frame 71 and the second frame 72.

A corner on one longitudinal end side of the first frame 71 facing the connector portion 28 of the upper plate 20 is notched, and from this notch 71a, a harness 73b of a connector 73 is extended and connected to a connector main body 73a.

On the upper surface of the first frame 71, six concave portions 74A through 74F (hereinafter, referred to as concave portions 74 when it is not necessary to distinguish the individual concave portions) having rectangular shapes in plan view are provided in a vertical row along the longitudinal direction of the first frame 71. The concave portions 74 are for inserting the frame portions 6 of the capacitors 2 and positioning the capacitors 2, and are formed into a size slightly larger than the frame portions 6. In the first frame 71, at the centers of each of the concave portions 74, circular holes 74a are provided. The holes 74a are for exposing male terminal bodies 91 and female terminal bodies 92 of the bus bars 90A through 90D from the first frame 71, and the inner diameter of the holes 74a is set to be a predetermined size larger than the outer diameter of female terminals 92b.

In one side surface on the other end in the longitudinal direction of the first frame 71, a connector insertion port 75 (see FIG. 9) is provided, and in the other side surface, a connector insertion port 76 (see FIG. 1) is provided. The connector insertion ports 75 and 76 are arranged in line in the width direction of the first frame 71, and are opened opposite each other.

The bus bars 90A through 90D will be described with reference to FIG. 14. The bus bars 90B and 90C have the same construction, the same shape, the same dimensions as those of the bus bars 40 of the upper plate 20, and each includes the male terminal body 91 including a projection 91a and a male terminal 91b, a female terminal body 92 including a projection 92a and a female terminal 92b, and a connecting plate 93 that connects the male terminal body 91 and the female terminal body 92. The dimension between the centers of the male terminal 91b and the female terminal 92b matches with the dimension between the centers of the positive terminal 8b and the negative terminal 9b in the two capacitors 2 and 2 that are connected thereto and arranged in parallel to each other. The bus bar 90B is fixed to the first frame 71 by projecting the tip end of the female terminal body 92 from the hole 74a of the second concave portion 74B from the side furthest from the connector 73, and projecting the tip end of the male terminal body 91 from the hole 74a of the third concave portion 74C. The bus bar 90C is fixed to the first frame 71 by projecting the tip end of the female terminal body 92 from the hole 74a of the fourth concave portion 74D from the side furthest from the connector 73, and projecting the tip end of the male terminal body 91 from the hole 74a of the fifth concave portion 74E. The bus bars 90B and 90C are arranged at the same height in the lower plate 70.

The bus bar 90A includes a terminal plate 94 and the male terminal body 91 welded to this terminal plate 94. The male terminal body 91 of the bus bar 90A is exactly the same as the male terminal bodies 91 of the bus bars 90B and 90C. The terminal plate 94 includes a horizontal portion 94a that is arranged at the same height as that of the connecting plate 93 of the bus bar 90B and extends in a direction approaching the bus bar 90B, and an input terminal portion 94b that is bent downward at right angles from the tip end side of the horizontal portion 94a and then extends horizontally toward one side surface of the first frame 71. The bus bar 90A is fixed to the first frame 71 by projecting the tip end of the male terminal 91 from the hole 74a of the first concave portion 74A from the side furthest from the connector 73, and projecting the tip end of the input terminal portion 94b into the connector insertion port 75 of the first frame 71 (see FIG. 9). The input terminal portion 94b of this bus bar 90A becomes an input terminal of the capacitor device 1A.

The bus bar 90D includes a terminal plate 95 and the female terminal body 92 welded to this terminal plate 95. The female terminal body 92 of the bus bar 90D is exactly the same as the female terminal bodies 92 of the bus bars 90B and 90C. The terminal plate 95 includes a first horizontal portion 95a that is arranged at the same height as that of the connecting plate 93 of the bus bar 90C and extends in a direction approaching the bus bar 90C, a second horizontal portion 95b that is bent downward at almost right angles from the tip end of the first horizontal portion 95a and then extends horizontally in a direction approaching the bus bar 90A along the longitudinal direction of the first frame 71, and an output terminal portion 95c that extends horizontally from the tip end side of the second horizontal portion 95b toward the other side surface of the first frame 71. The bus bar 90D is fixed to the first frame 71 by projecting the tip end of the female terminal body 92 from the hole 74a of the first concave portion 74F from the side closest to the connector 73 in the first frame 71, and projecting the tip end of an output terminal portion 95c into the connector insertion port 76 of the first frame 71 (see FIG. 1). The second horizontal portion 95b is disposed below the connecting plates 93 of the bus bars 90B and 90C and the horizontal portion 94a of the bus bar 90A while spaced from these so that the insulating state between the bus bar 90D and the bus bars 90A, 90B, and 90C is maintained. The output terminal portion 95c of this bus bar 90D becomes an output terminal of the capacitor device 1A.

To the terminal plate 94 of the bus bar 90A, the connecting plates 93 and 93 of the bus bars 90B and 90C, and the terminal plate 95 of the bus bar 90D, leads 96 formed of square wires are connected, and the leads 96 are held in a state such that they are spaced from each other and extend in a direction approaching the notch 71a of the first frame 71, and are electrically connected to the harness 73b of the connector 73.

The second frame 72 is fitted to the bottom of the first frame 71 from the back surface side of the four bus bars 90A through 90D, and fixed to the first frame 71 by the bolts 80.

Figure 15:
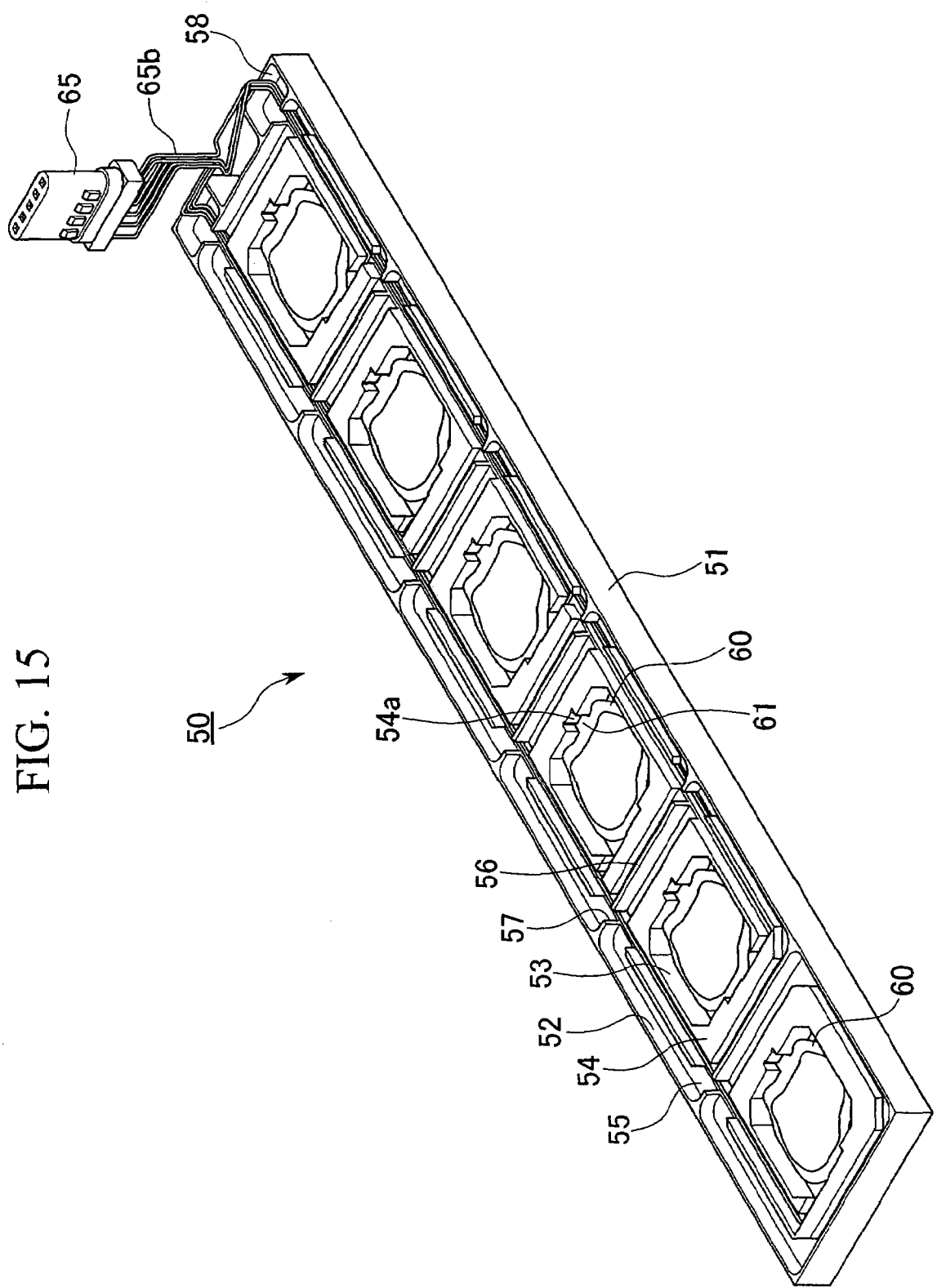
FIG. 15 is an external perspective view of an intermediate plate in the capacitor device.
Figure 16:
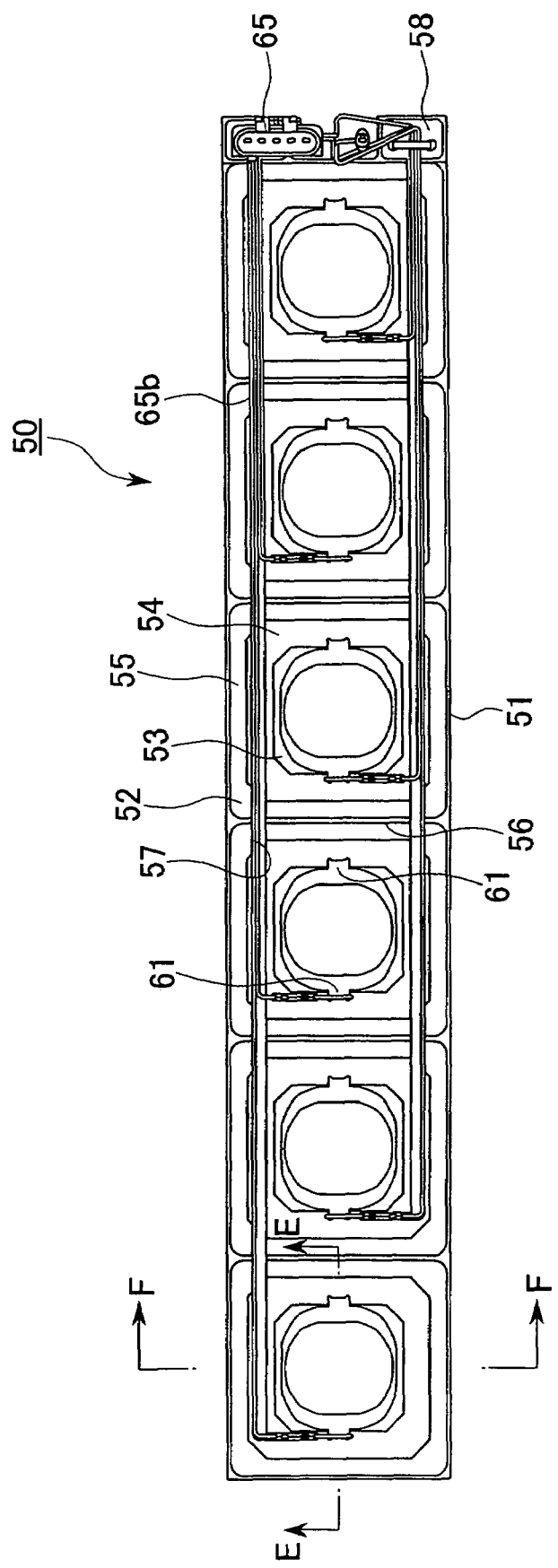
FIG. 16 is a plan view of the intermediate plate shown in FIG. 15.
Figure 17:
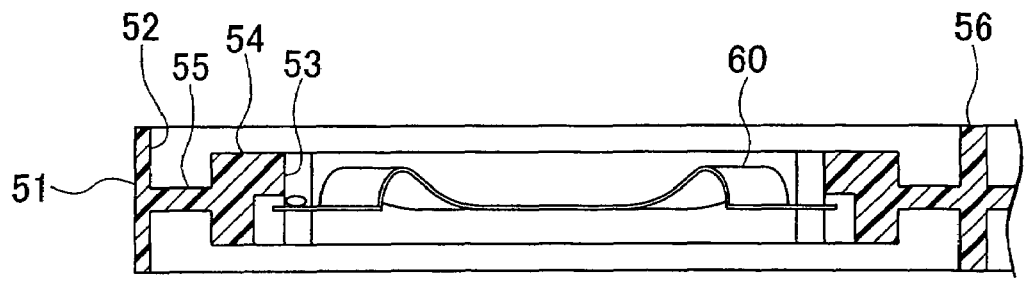
FIG. 17 is a sectional view taken along the line E-E of FIG. 16.
Figure 18:
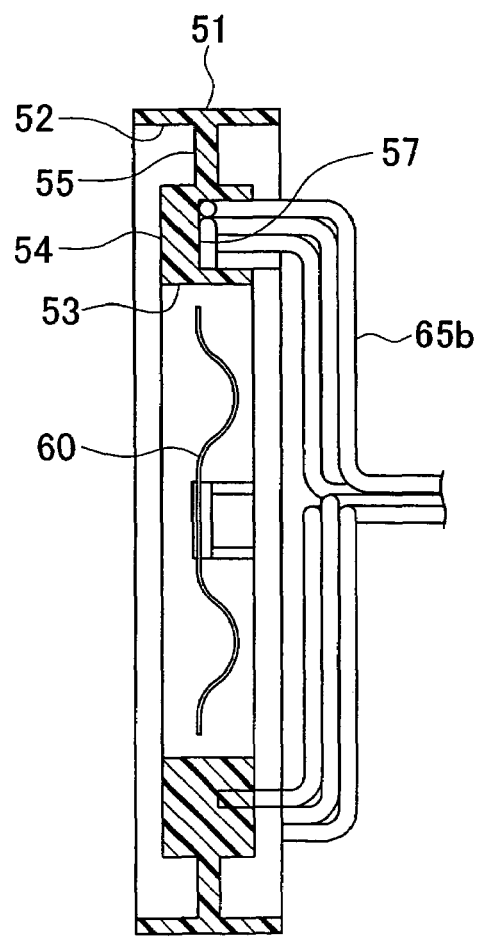
FIG. 18 is a sectional view taken along the line F-F of FIG. 16.

Next, the intermediate plate 50 will be described in FIGS. 15-19, in which FIG. 15 is an external perspective view of the intermediate plate 50, FIG. 16 is a plan view of the intermediate plate 50, FIG. 17 is a sectional view taken along the line EE of FIG. 16, FIG. 18 is a sectional view taken along the line F-F of FIG. 16, and FIG. 19 is a sectional view in a state in which the two capacitors 2 and 2 are connected across the intermediate plate 50.

The intermediate plate 50 mainly includes a frame 51 made of a resin, six terminal bodies (voltage detecting terminals) 60 made of a conductive metal (for example, copper), and a connector 65.

The frame 51 has a roughly rectangular shape in plan view, and on both front and back surfaces of the frame 51, six concave portions 52, 52 . . . having roughly rectangular shapes in plan view are provided in a vertical row along the longitudinal direction of the frame 51, respectively, and the concave portions 52 on the front surface side and the concave portions 52 on the back surface side are arranged at the same position in plan view. The concave portions 52 are for inserting the frame portions 6 of the capacitors 2 and positioning the capacitors 2, and are formed into a size slightly larger than the frame portions 6. In the frame 51, at the centers of the concave portions 52, roughly rectangular holes 53 are provided, and the dimension between the centers of the holes 53 and 53 adjacent to each other matches the dimension between the centers of the positive terminal 8b and the negative terminal 9b in the two capacitors 2 and 2 that are connected thereto and arranged in parallel to each other. The holes 53 are for accommodating the terminal bodies 60 and penetrating the fitting portion between the positive terminal 8b and the negative terminal 9b when the two capacitors 2 and 2 are connected in series as shown in FIG. 19, and the inner diameter of the holes 53 is set to be a predetermined size larger than the outer diameter of the terminal body 60. This hole 53 is surrounded by a thick portion 54 with a roughly rectangular shape in plan view, and the outside of the thick portion 54 is surrounded by a groove 55. At the front surface side of the frame 51, in a predetermined portion of the thick portion 54 and in a partition 56 between the concave portions 52 and 52 adjacent to each other, a harness insertion groove 57 for wiring the harness 65b of the connector 65 is formed.

In addition, on one end side in the longitudinal direction of the frame 51 opposite the connector portion 28 of the upper plate 20, a harness extracting portion 58 is provided.

The terminal body 60 is made of a conductive metal (for example, copper), and has a roughly circular shape in plan view and is bent so as to become wavy in the plate thickness direction, and has a function as a leaf spring. The terminal body 60 is supported by the frame 51 while housed in the hole 53 of the frame 51. In detail, on the terminal body 60, a pair of claws 61 and 61 are provided while spaced by 180 degrees circumferentially, and by fitting the claws 61 into slits 54a formed in the inner peripheral surface of the thick portions 54 in the frame 51, the terminal body 60 is attached to the frame 51. As shown in FIG. 19, the inner diameter of the terminal body 60 is set to a dimension that enables the negative terminal 9b of the capacitor 2 to penetrate the terminal body, and the outer diameter of the terminal body 60 is set so that the terminal body 60 is sandwiched between the flanges 7a and 7a of the dish members 7 and 7 of the capacitors 2 and 2 when the positive terminal 8b and the negative terminal 9b of the two capacitors 2 and 2 are inserted into the inside of the terminal body 60 and fitted, and the waving height of the terminal body 60 (height of the bent portion) is set so that the terminal body 60 is compressed by the flanges 7a and 7a when the positioning projections 8a and 9a of the two capacitors 2 and 2 are butted against each other.

The connector 65 has six harnesses 65b, 65b . . . extending from the connector main body 65a, and the harnesses 65b are drawn into the concave portions 52 of the frame 51 via the harness extracting portion 58 of the frame 51, wired along the harness insertion groove 54 on the front surface side of the frame 51, and electrically connected to the respective terminal bodies 60.

Next, a complete product of this capacitor device 1A will be described.

In this capacitor device 1A, the connector portion 28 of the upper plate 20, the harness extracting portion 58 of the intermediate plate 50, and the notch 71a of the lower plate 70 are positioned on the same side in the longitudinal direction.

To the male terminals 91b or the female terminals 92b of the bus bars 90A through 90D exposed to the upper surface of the lower plate 70, the negative terminals 9b or the positive terminals 8b of the capacitors 2 on the lower stage are fitted, and the projections 91a and 92a of the bus bars 90A through 90D are butted against the positioning projections 8a and 9a of the capacitors 2. The positions in the axial direction of the capacitors 2 with respect to the lower plate 70 are determined according to the butting between the projections 91a and 92a and the positioning projections 8a and 9a, and accordingly, the fitting state between the male terminals 91b and the negative terminals 9b and the fitting state between the female terminals 92b and the positive terminals 8b become optimum. The frame portions 6 of the capacitors 2 are inserted into the concave portions 74 of the lower plate 70, whereby the capacitors 2 can be easily positioned with respect to the lower plate 70, and the capacitors 2 are prevented from rotating. The positions in the axial direction of the capacitors 2 with respect to the lower plate 70 are determined according to the butting between the projections 91a and 92a and the positioning projections 8a and 9a, so that the tip ends of the frame portions 6 in the capacitors 2 are not in contact with the surfaces of the concave portions 74 of the lower plate 70.

Furthermore, onto the six capacitors 2, 2 . . . on the lower stage, the capacitors 2, 2 . . . on the upper stage are connected in series via an intermediate plate 50. FIG. 19 is a figure showing this connecting state, and in the state in which the positive terminal 8b and the negative terminal 9b of the capacitors 2 and 2 are fitted to each other, the positioning projections 8a and 9a are butted, and the fitting between the positive terminal 8b and the negative terminal 9b penetrates the hole 53 of the intermediate plate 50 and the terminal body 60 and the flanges 7a and 7a of the capacitors 2 and 2 press-fit with the terminal body 60 from both front surface and back surface sides. The frame portions 6 of the capacitors 2 on the upper and lower stages are inserted into the concave portions 52 of the intermediate plate 50, whereby the capacitors 2 can be easily positioned with respect to the intermediate plate 50, and the capacitors 2 are prevented from rotating. The relative positions in the axial direction of the two capacitors 2 and 2 connected in series are determined according to the butting between the positioning projection 8a and the positioning projection 8a, whereby the fitting state between the positive terminal 8b and the negative terminal 9b becomes optimum. The frame portions 6 of the capacitors 2 are inserted into the groove 55, and the tip ends of the frame portions 6 are in contact with the surface of the groove 54 of the intermediate plate 50.

Furthermore, to the positive terminals 8b or negative terminals 9b of the six capacitors 2, 2 . . . on the upper stage, the female terminals 42b or male terminals 41b of the bus bars 40 exposed to the bottom surface of the upper plate 20 are fitted, and the projections 41a and 42a of the bus bars 40 are butted against the positioning projections 8a and 9a of the capacitors 2, whereby the upper plate 20 is attached. The positions in the axial direction of the capacitors 2 with respect to the upper plate 20 are determined according to the butting of the projections 41a and 42a and the positioning projections 8a and 9a, whereby the fitting state between the male terminal 41b and the negative terminal 9b and the fitting state between the female terminal 42b and the positive terminal 8b becomes optimum. The frame portions 6 of the capacitors 2 are inserted into the concave portions 27 of the upper plate 20, whereby the capacitors 2 can be easily positioned with respect to the upper plate 20, and the capacitors 2 are prevented from rotating. The positions in the axial direction of the capacitors 2 with respect to the upper plate 20 are determined according to the butting of the projections 41a and 42a and the positioning projections 8a and 9a, so that the tip ends of the frame portions 6 of the capacitors 2 are not in contact with the surfaces of the concave portions 27 of the upper plate 20.

The resin sheet 30 provided at the installing position of the thermistor 29 on the upper plate is in close contact with the top plate 4 of the capacitor 2. Thereby, an electrical signal corresponding to the temperature of the capacitor 2 can be outputted to the capacitor temperature control circuit of the control board 24.

Then, the connector main body 73a of the connector 73 in the lower plate 70 is inserted into one connector insertion port 28a of the upper plate 20, whereby the four bus bars 90A through 90D of the lower plate 70 are electrically connected to the capacitor voltage detecting circuit of the control board 24 installed inside the upper plate 20. The connector main body 65a of the connector 65 in the intermediate plate 50 is inserted into the other connector insertion port 28a of the upper plate 20, whereby the six terminal bodies 60, 60 . . . of the intermediate plate 50 are electrically connected to the capacitor voltage detecting circuit of the control board 24 installed inside the upper plate 20.

In the capacitor device 1A thus constructed, all twelve capacitors 2, 2 . . . are connected in series. In detail, the capacitor 2 positioned on the rightmost side of the lower stage in FIG. 1 is connected to the input terminal portion 94b of the lower plate 70, and this capacitor 2 is connected in series to the capacitor 2 on the rightmost side on the upper stage. The capacitor 2 on the rightmost side of the upper stage is connected in series to the second capacitor 2 from the right side of the upper stage via the bus bar 40 inside the upper plate 20, and this second capacitor 2 from the right side of the upper stage is connected in series to the second capacitor 2 from the right side of the lower stage. Furthermore, the second capacitor 2 from the right side of the upper stage is connected in series to the third capacitor 2 from the right side of the lower stage via the bus bar 90B inside the lower plate 70. In the same manner, the capacitors 2 are successively connected in series to the capacitors on the adjacent rows while the capacitors 2 and 2 on the upper and lower stages are connected in series. In FIG. 1, the capacitor 2 positioned on the leftmost side on the lower stage becomes a terminal end, and this capacitor 2 is connected to the output terminal portion 95c of the lower plate 70.

Then, as described above, the three bus bars 40, 40, and 40 of the upper plate 20, the four bus bars 90A through 90D of the lower plate 70, and the six terminal bodies 60, 60 . . . of the intermediate plate 50 are electrically connected to the capacitor voltage detecting circuit of the control board 24 installed inside the upper plate 20, so that not only can the total voltage of the capacitor device 1A be detected but also the voltages of the individual capacitors 2 and the voltages of the groups connecting predetermined numbers of the capacitors 2 can be detected as appropriate. Therefore, a precise voltage control of the capacitor device 1A can be achieved.

In addition, in this capacitor device 1A, the intermediate plate 50 is disposed between the six capacitors 2, 2 . . . on the upper stage and the six capacitors 2, 2 . . . on the lower stage and these capacitors are positioned and prevented from rotating, so that even after completion of assembly, the relative positional relationship among the capacitors 2 is not altered, whereby the form can be stabilized. The capacitors 2, 2 . . . on the upper stage and the capacitors 2, 2 . . . on the lower stage are positioned with respect to the upper plate 20 and the lower plate 70 and are prevented from rotating, so that even after completion of assembly, the relative positional relationship among the capacitors 2 is not altered, and the form can be stabilized.

In addition, in this structure, the entirety of the twelve capacitors 2, 2 . . . are not covered by a casing but are held by being sandwiched by the upper plate 20 and the lower plate 70, so that the capacitor device 1A can be reduced in size and weight.

Second Embodiment

Next, a second embodiment of a capacitor device according to the present invention will be described with reference to FIG. 20 through FIG. 37.

Figure 20:
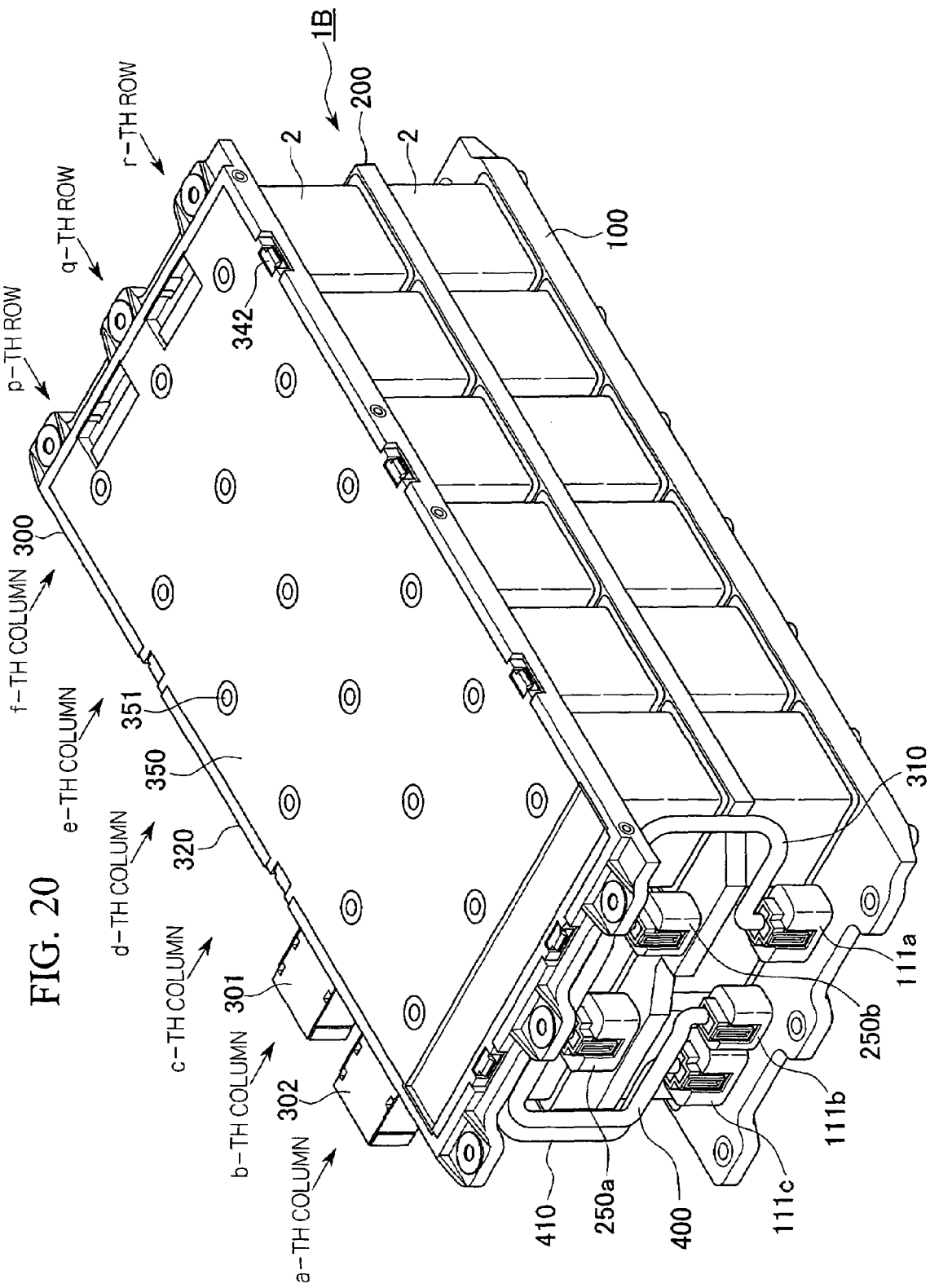
FIG. 20 is an external perspective view of a capacitor device according to a second embodiment of the invention.

FIG. 20 is an external perspective view of a capacitor device 1B of the second embodiment, and the capacitor device 1B is constructed so that 36 capacitors 2, 2 . . . as capacitor elements are sandwiched and held between an upper plate 100 and a lower plate 300. The capacitors 2, 2 . . . are arranged on two upper and lower stages, and each stage includes 18 capacitors in total in 3 rows and 6 columns, and an intermediate plate 200 is disposed between the 18 of the capacitors 2, 2 . . . on the upper stage and the 18 capacitors 2, 2 . . . on the lower stage. In this capacitor device 1B, all the 36 capacitors 2, 2 . . . are connected in series. The capacitors 2 are the same as the capacitors 2 of the first embodiment, so that FIG. 2A and FIG. 2B are referred to again and description thereof is omitted.

FIG. 20 shows the capacitor device 1B by turning it upside down for the sake of description, and it is illustrated by turning the upper plate 100 downward and the lower plate 300 upward.

Figure 21:
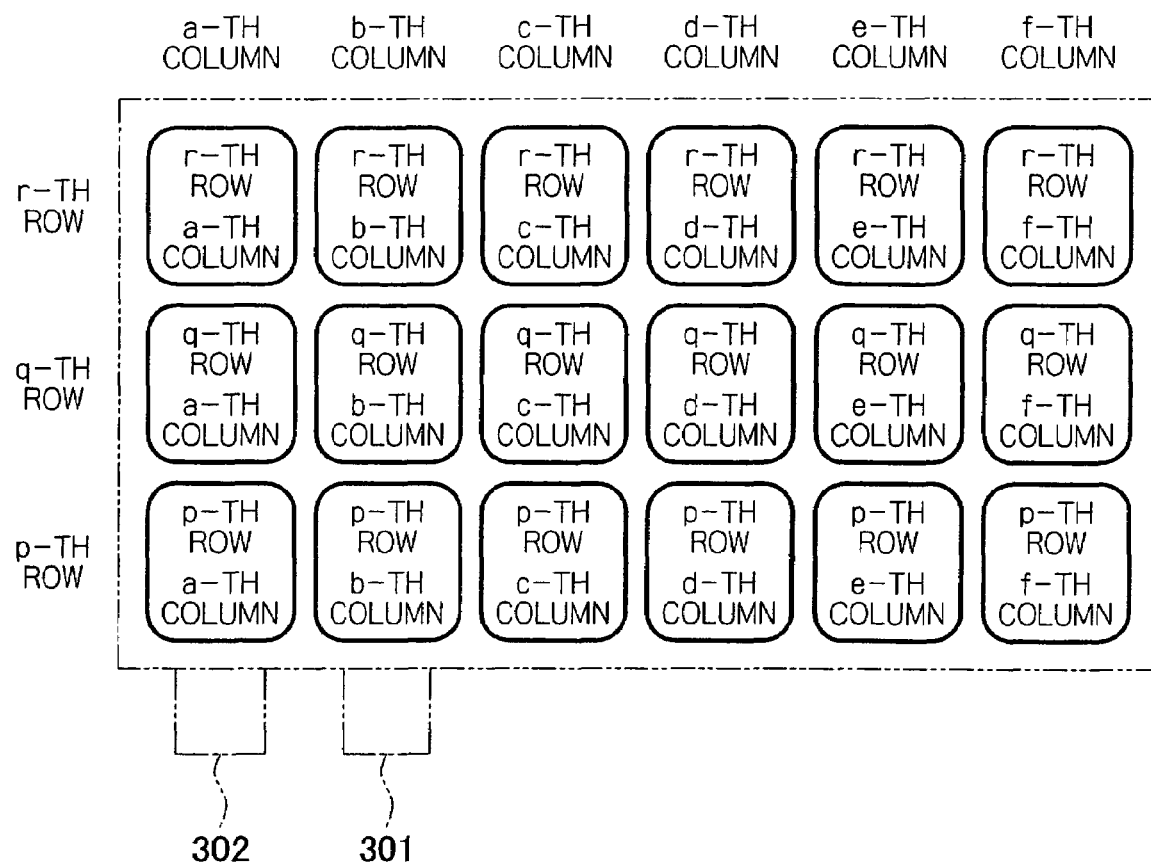
FIG. 21 is a layout plan view of capacitors in the capacitor device.

In the description given below, the portions where the capacitors 2 are arranged must be specified, so that a coordinate system consisting of 3 rows (p-th row, q-th row, and r-th row) and 6 columns (a-th column, b-th column, c-th column, d-th column, e-th column, and f-th column) is set in plan view of the capacitor device 1B when the upper plate 100 is set upward as shown in FIG. 21, and the capacitors are specified as, for example, "capacitor 2 on p-th row in c-th column of the lower stage."

Figure 22:
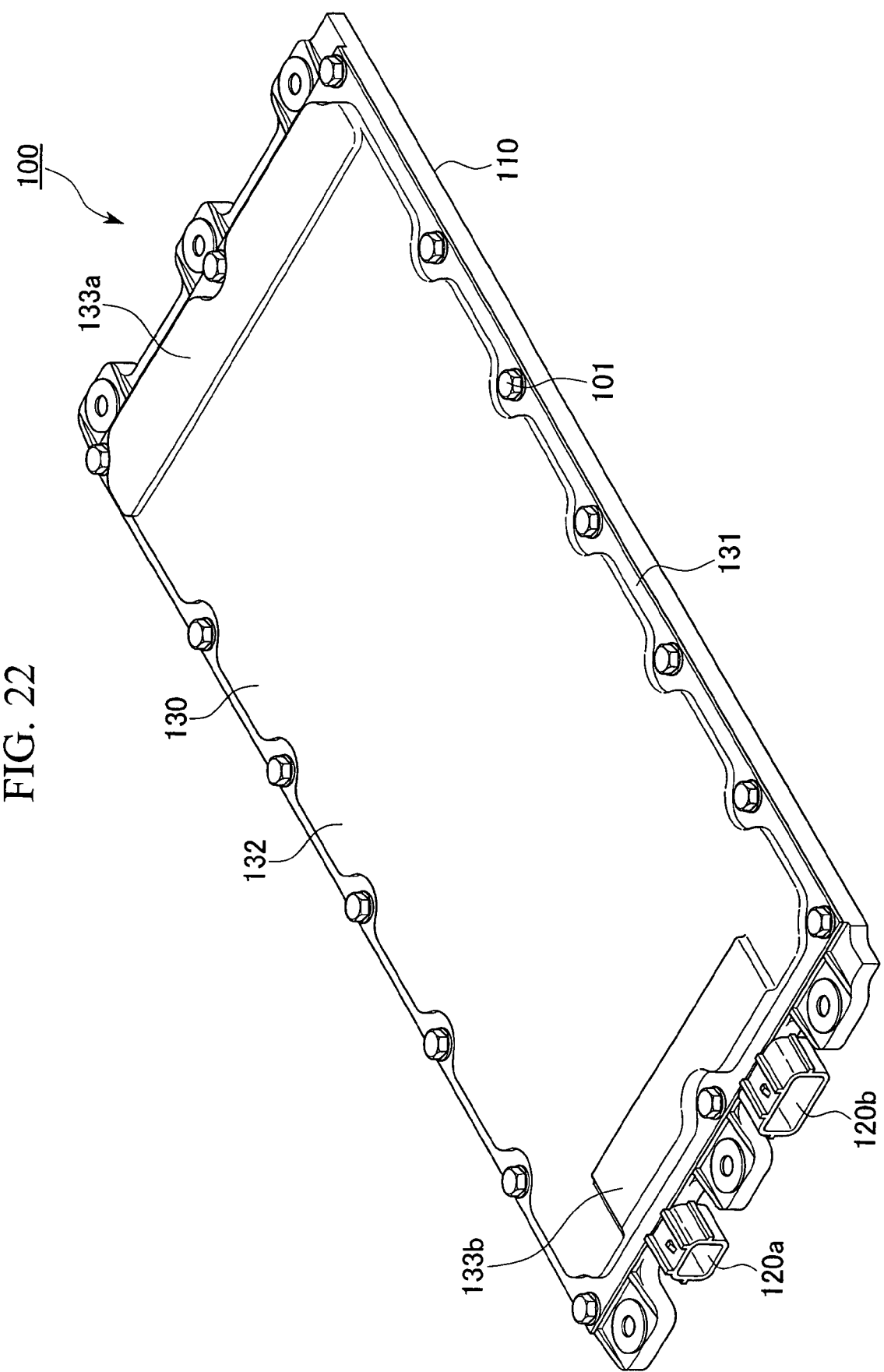
FIG. 22 is an external perspective view of an upper plate in the capacitor device.
Figure 24:
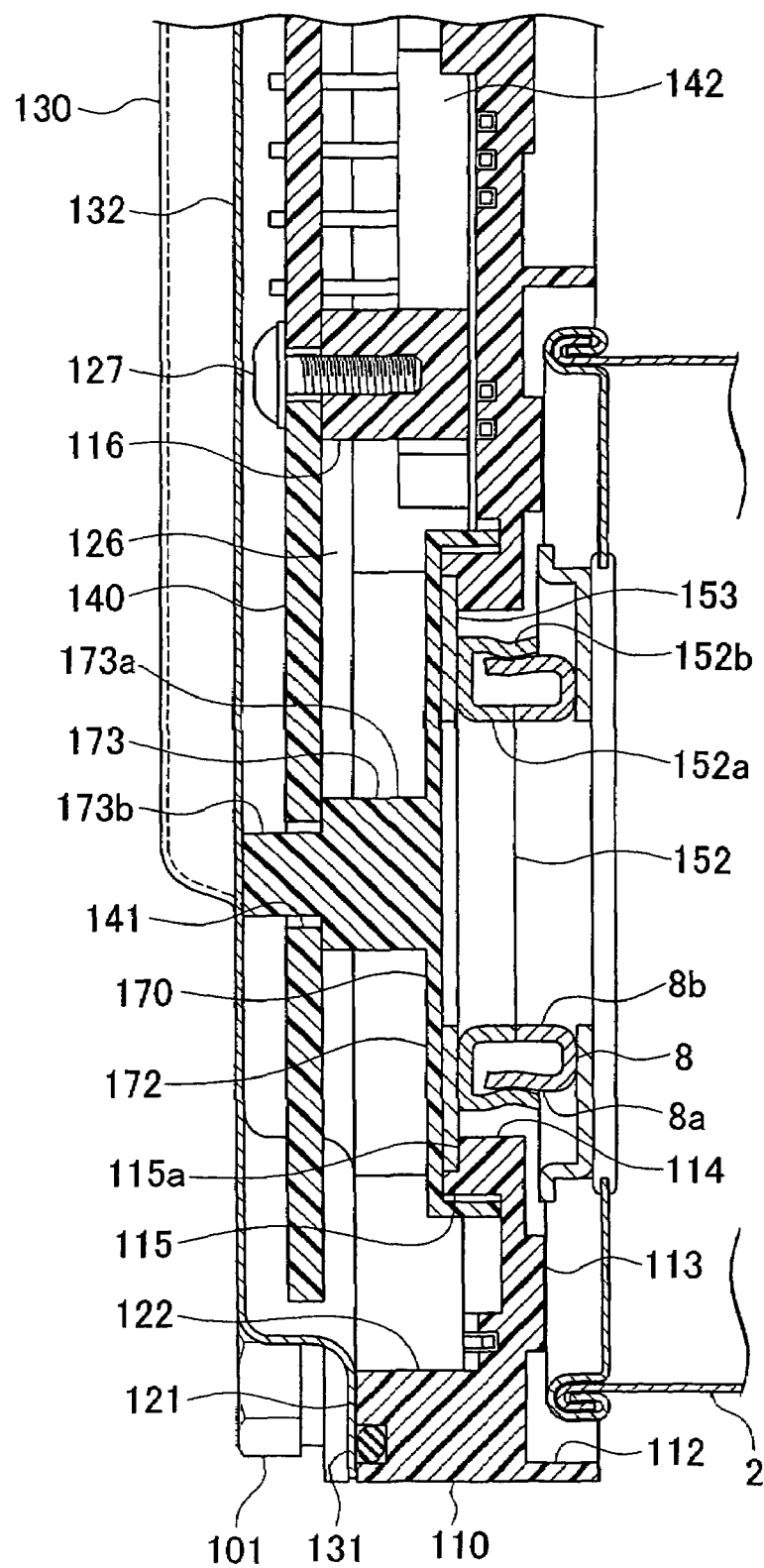
FIG. 24 is a sectional view taken along the line G-G of FIG. 23.
Figure 25:
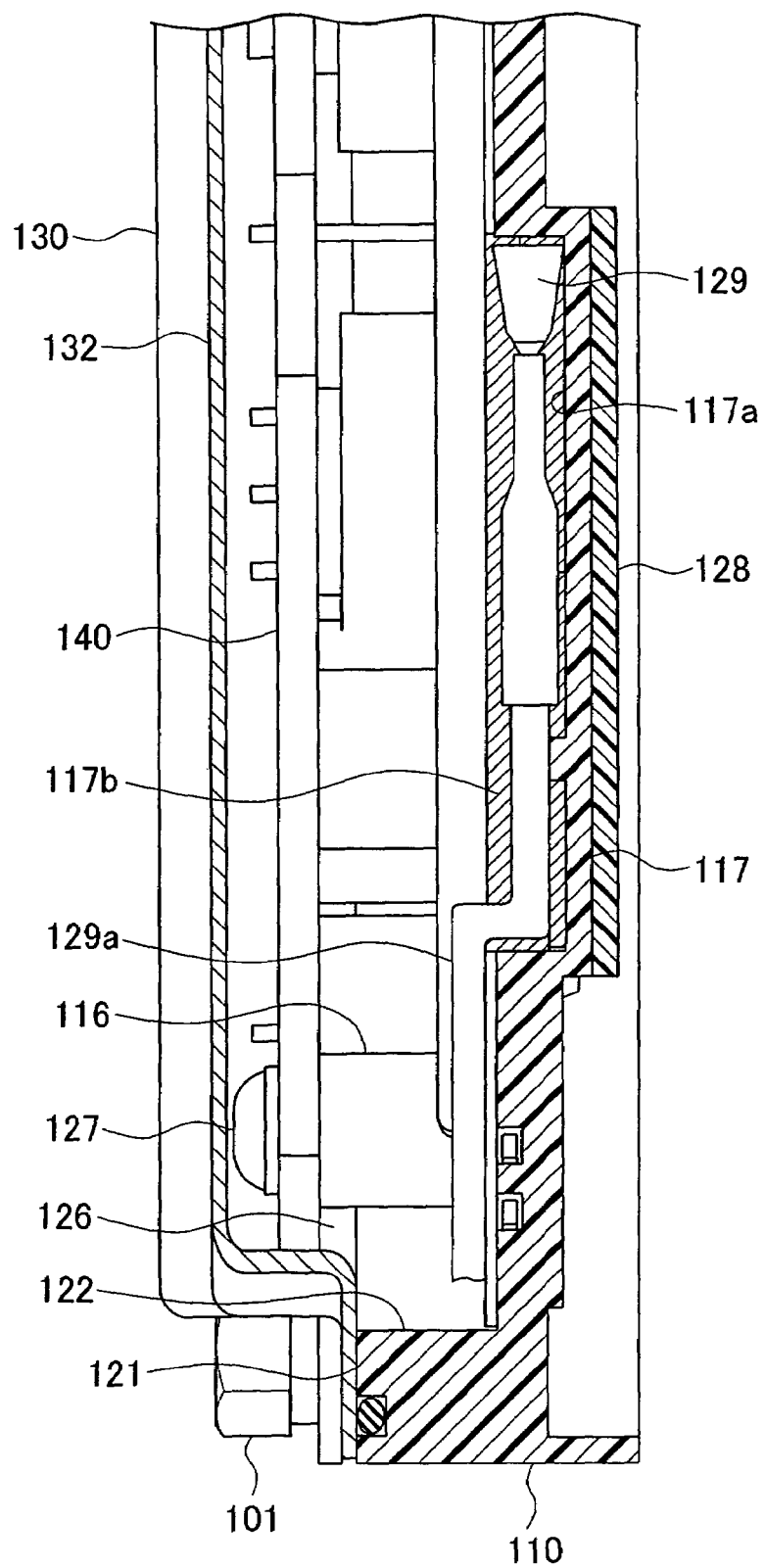
FIG. 25 is a sectional view taken along the line H-H of FIG. 23.

First, the upper plate 100 will be described. FIG. 22 is an external perspective view of the upper plate 100, FIG. 23 is an external perspective view of the upper plate 100 from the reverse side, FIG. 24 is a sectional view taken along the line G-G of FIG. 23, and FIG. 25 is a sectional view taken along the line H-H of FIG. 23.

The upper plate 100 is formed into a plate-shaped body with a roughly rectangular shape in plan view, and mainly includes a frame 110 made of resin, a cover 130 made of metal, a control board 140 including circuits for monitoring the voltages and the temperatures of the capacitors 2 (a capacitor voltage detecting circuit and a capacitor temperature control circuit), nine bus bars (connecting members) 150 for connecting the positive terminals 8b and the negative terminals 9b of two adjacent capacitors 2 and 2, and nine bus bar covers 170 for fixing the bus bars 150, the cover 130 is fixed onto the frame 110 with bolts 101, and between the frame 110 and the cover 130, the control board 140, the bus bars 150, and the bus bar covers 170 are accommodated.

Figure 26:
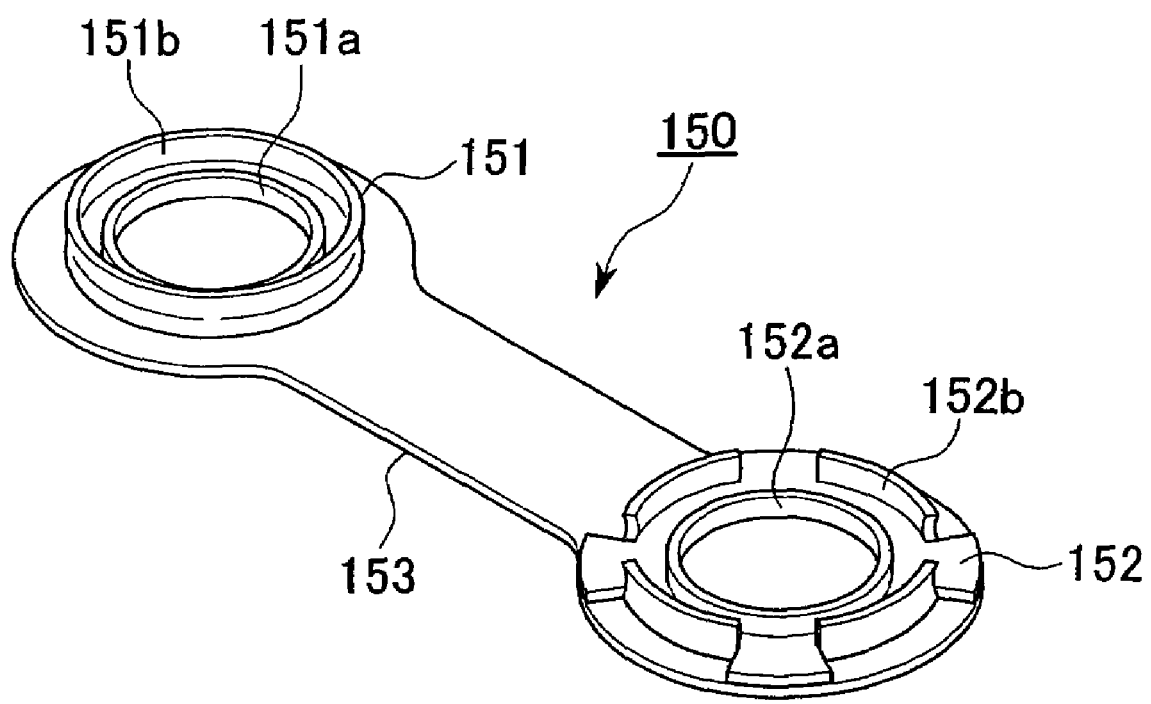
FIG. 26 is an external perspective view of a bus bar on the upper plate.

The bus bar 150 is made of a conductive metal (for example, copper), and as shown in FIG. 26, includes a male terminal body 151 and a female terminal body 152 formed into the same shape and the same dimensions as those of the positive terminal body 8 and the negative terminal body 9 of the capacitors 2, and a tabular connecting plate 153 that connects these male terminal body 151 and female terminal body 152. The male terminal body 151 has a projection 151a and a male terminal 151b corresponding to the projection 8a and the positive terminal 8b of the positive terminal body 8, the female terminal body 152 has a projection 152a and a female terminal 152b corresponding to the projection 9a and the negative terminal 9b of the negative terminal body 9, and the male terminal body 151 is welded to one end of the connecting plate 153 and the female terminal body 152 is welded to the other end of the connecting plate 153. The dimension between the centers of the male terminal 151b and the female terminal 152b matches the dimension between the centers of the positive terminal 8b and the negative terminal 9b of the two capacitors 2 and 2 that are connected thereto and arranged in parallel to each other.

Figure 23:
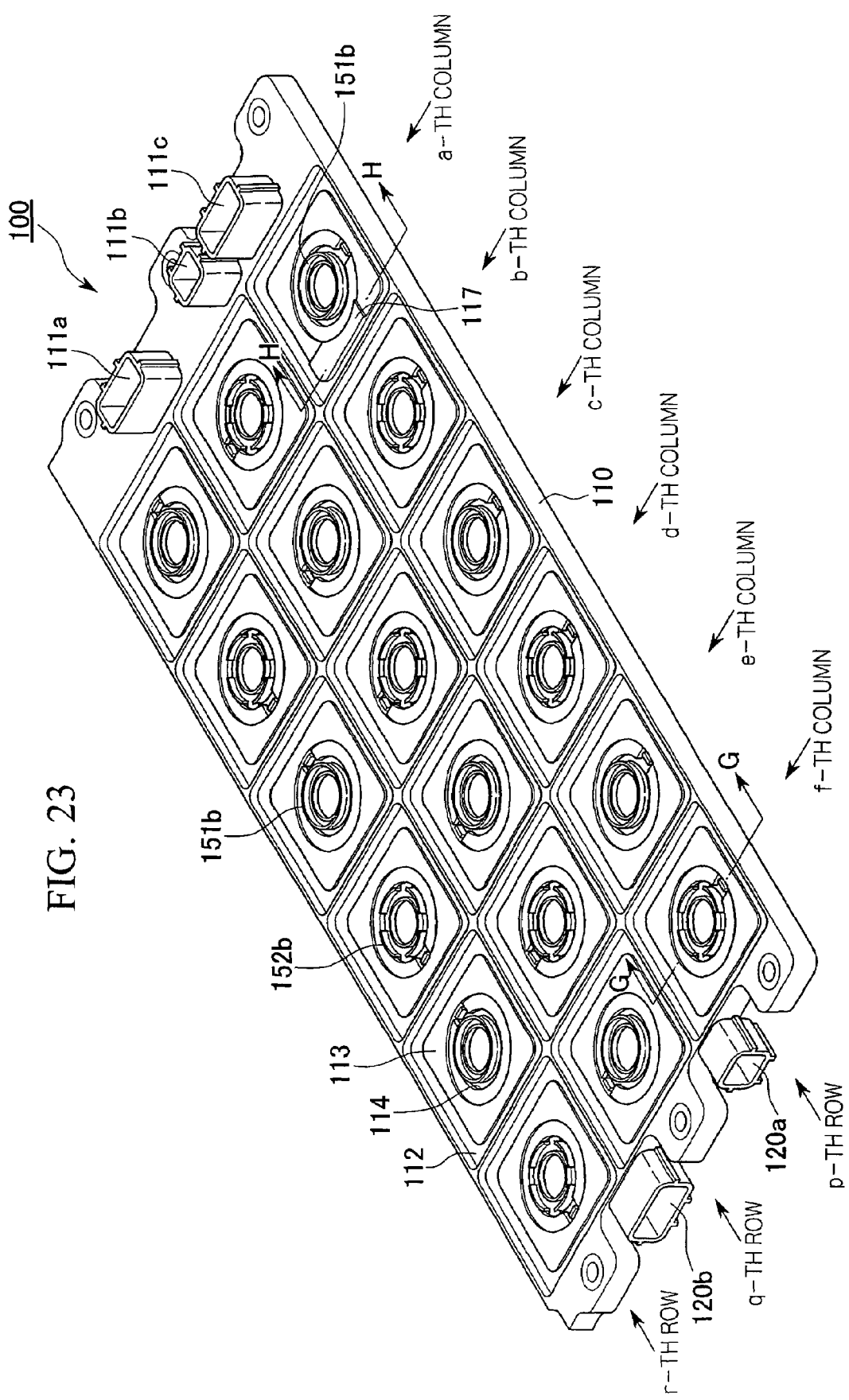
FIG. 23 is an external perspective view of the upper plate shown in FIG. 22 from the reverse side.

As shown in FIG. 23, on the bottom surface of the frame 110, three connector insertion ports 111a, 111b, and 111c are projectedly provided in a direction separate from the cover 130 (downward) on the end of the a-th column side. Pin connectors (not shown) provided inside the respective connector insertion ports 111a, 111b, and 111c are connected to the capacitor voltage detecting circuit of the control board 140.

On the bottom surface of the frame 110, 18 concave portions 112, 112 . . . having rectangular shapes in plan view are provided in total in 3 rows and 6 columns in a lattice pattern. This concave portion 112 is for inserting the frame portion 6 of the capacitor 2 and positioning the capacitor 2, and is formed into a size slightly larger than the frame portion 6. At the centers of the concave portions 112, projecting portions 113 having roughly rectangular shapes in plan view are projectedly provided, and at the centers thereof, circular holes 114 perforating to the upper surface of the frame 10 are provided. The holes 114 are for exposing the male terminal bodies 151 and the female terminal bodies 152 of the bus bars 150 from the frame 110, and the inner diameters of the holes 114 are set to be a predetermined size larger than the outer diameters of the female terminals 152b.

Furthermore, on the bottom surface of the frame 110, at a corner of the projecting portion 113 on the p-th row in the a-th column, a convex portion 117 projecting downward more than the projecting portion 113 is formed. As shown in FIG. 25, in a groove 117a formed inside the convex portion 117, a thermistor 129 for detecting the temperature of the capacitor 2 is disposed in close contact with the frame 110, and the thermistor 129 is fixed by silicone 117b filled in a groove 117a and electrically connected to the capacitor temperature control circuit of the control board 14 via a lead wire 129a. To the front surface of the convex portion 117, a gel resin sheet 128 with high heat conductance is attached.

To the end face on the f-th column side of the frame 110, two connector insertion ports 120a and 120b are provided. Pin connectors (not shown) provided inside the connector insertion ports 120a and 120b are connected to the control board 140.

Figure 27:
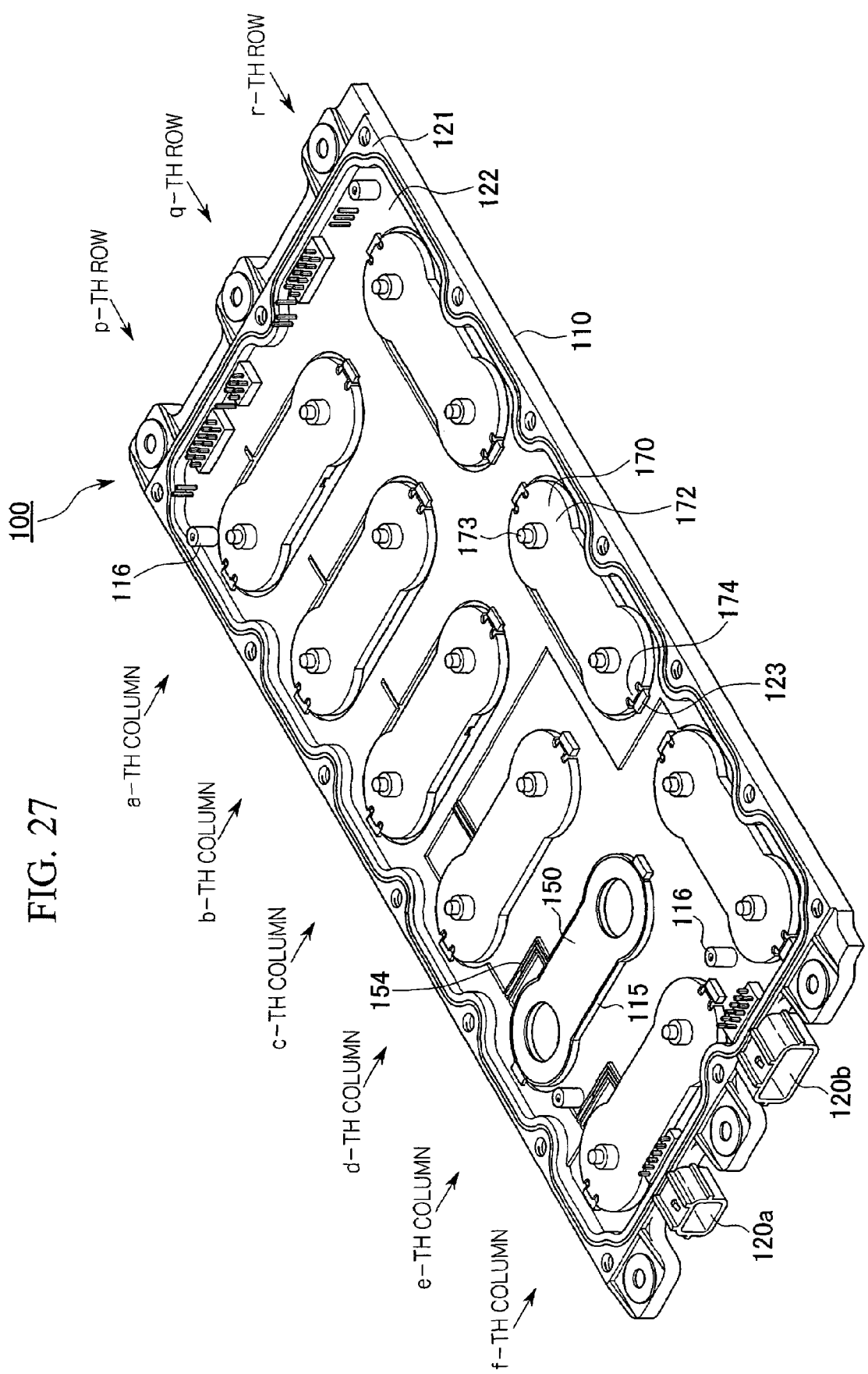
FIG. 27 is a perspective view of the upper plate shown in FIG. 23 in a state in which a part of the construction is removed.

FIG. 27 is a perspective view of the upper plate 100 from which the cover 130 and the control board 140 are removed. As shown in FIG. 27 and FIG. 24, on the upper surface of the frame 110, a cover attaching seat 121 is formed along the outer peripheral edge, and on the inner side of the cover attaching seat 121, an accommodating concave portion 122 is formed. In this accommodating concave portion 122, a standing wall portion 115 that surrounds the two holes 114 and 114 adjacent to each other is provided so as to stand up from the upper surface of the frame 110, and at the tip end inner peripheral portion of this standing wall portion 115, a stepped portion 115a is formed. The standing wall portion 115 functions as a positioning concave portion when attaching the bus bar 150 and is shaped so that the connecting plate 153 of the bus bar 150 is fitted in with almost no gap, and is set so that it receives the outer periphery of the connecting plate 153 by the stepped portion 115a and in this state, the connecting plate 153 and the tip end of the standing wall portion 115 become the same surface. The standing wall portions 115 are formed so as to surround the holes 114 and 114 on p-th and q-th rows of each of the a-th through f-th columns, and surround the holes 114 and 114 of the a-th and b-th columns, the c-th and d-th columns, and the e-th and f-th columns in the r-th row, respectively.

In the respective standing wall portions 115, the bus bars 150 are fitted so that the tip ends of the male terminal 151b and the female terminal 152b protrude out from the two holes 114 and 114 on the inner sides of the standing wall portions 115. In the second embodiment, as shown in FIG. 23, the male terminal 151b is disposed inside the hole 114 on the p-th row in the a-th column, and starting from this male terminal 151b, terminals adjacent to each other are arranged so that the female and the male are opposite each other. To the connecting plates 153 of the respective bus bars 150, leads 154 are connected, and the connecting plates are electrically connected to the capacitor voltage detecting circuit of the control board 140 via the leads 154.

Onto the standing wall portions 115 to which the bus bars 150 are attached, bus bar covers 170 are attached. As shown in FIG. 24 and FIG. 27, the bus bar cover 170 has a roughly U-shaped section so that it is fitted to the standing wall portion 115 from above with almost no gap, and the bottom surface 171 of the bus bar cover 170 comes into contact with the tip end of the standing wall portion 115. The bus bar cover 170 is fixed to the frame 110 by engaging hooks 174 formed on both ends in the longitudinal direction of the bus bar cover with engagement portions 123 formed in the accommodating concave portion 122 of the frame 110.

On the upper surface 172 of the bus bar cover 170, at portions corresponding to the holes 114 of the frame 110 in an assembly state, stepped columnar bosses 173 are projectedly provided. The boss 173 is formed so that its base side is a larger diameter portion 173a and its tip end side is a smaller diameter portion 173b.

At predetermined portions in the accommodating concave portion 122 of the frame 110, control board attaching bosses 116, 116 . . . are projectedly provided, and the control board 140 is placed on these bosses 116, 116 . . . and fixed to the bosses 116, 116 . . . by screws 127. The in-plane direction of the control board 140 thus attached becomes parallel to the frame 110. In other words, the in-plane direction of the control board 140 is orthogonal to the axial direction of the capacitor 2. In the control board 140, as shown in FIG. 24, holes 141 for inserting the smaller diameter portions 173b of the bosses 173 of the respective bus bar covers 170 are formed. The holes 141 are set to a size that allows insertion of the smaller diameter portions 173b through the holes with play and does not allow insertion of the larger diameter portions 173a of the bosses 173.

The heights of the larger diameter portions 173a in the bosses 173 of the bus bar covers 170 are set so as to be almost equal to or slightly lower than the heights of the control board attaching bosses 116 in a state in which the control board 140 and the bus bar covers 170 are attached to the frame 110, and the upper surfaces of the larger diameter portions 173a do not come into contact with the bottom surface of the control board 140, and even if they come into contact with the bottom surface, the contact is slight.

As shown in FIG. 24, to the control board 140, a number of electronic parts 142 are attached, and all the electronic parts 142 are set toward the upper surface side of the frame 110. Namely, the electronic parts 142 are accommodated in a space 126 formed between the control board 140 and the frame 110, and are not attached to the side higher than the control board 140 (the side separate from the frame 110). By installing the control board 140 by thus arranging the electronic parts 142, the height of the upper plate 100 can be reduced.

As shown in FIG. 22 and FIG. 24, the cover 130 has a hat-shaped section, and is fixed to the frame 110 by bolts 101 by placing a flat rim portion 131 formed on the outer periphery on the cover attaching seat 121 of the frame 110. A top plate 132 of the cover 130 is formed flat except for hill portions 133a and 133b that are formed to be higher on both ends in the longitudinal direction (portions corresponding to the a-th and f-th columns). The hill portions 133a and 133b have the same height, and upper surfaces of both the hill portions 133a and 133b are formed into flat surfaces and positioned highest in the upper plate 100. Only the tip ends of the bosses 173 of the bus bar covers 170 penetrating the control board 140 butt against the inner surface of the top plate 132 of the cover 130. Namely, the heads of screws 127 that fix the control board 140 are not in contact with the inner surface of the cover 130.

Figure 28:
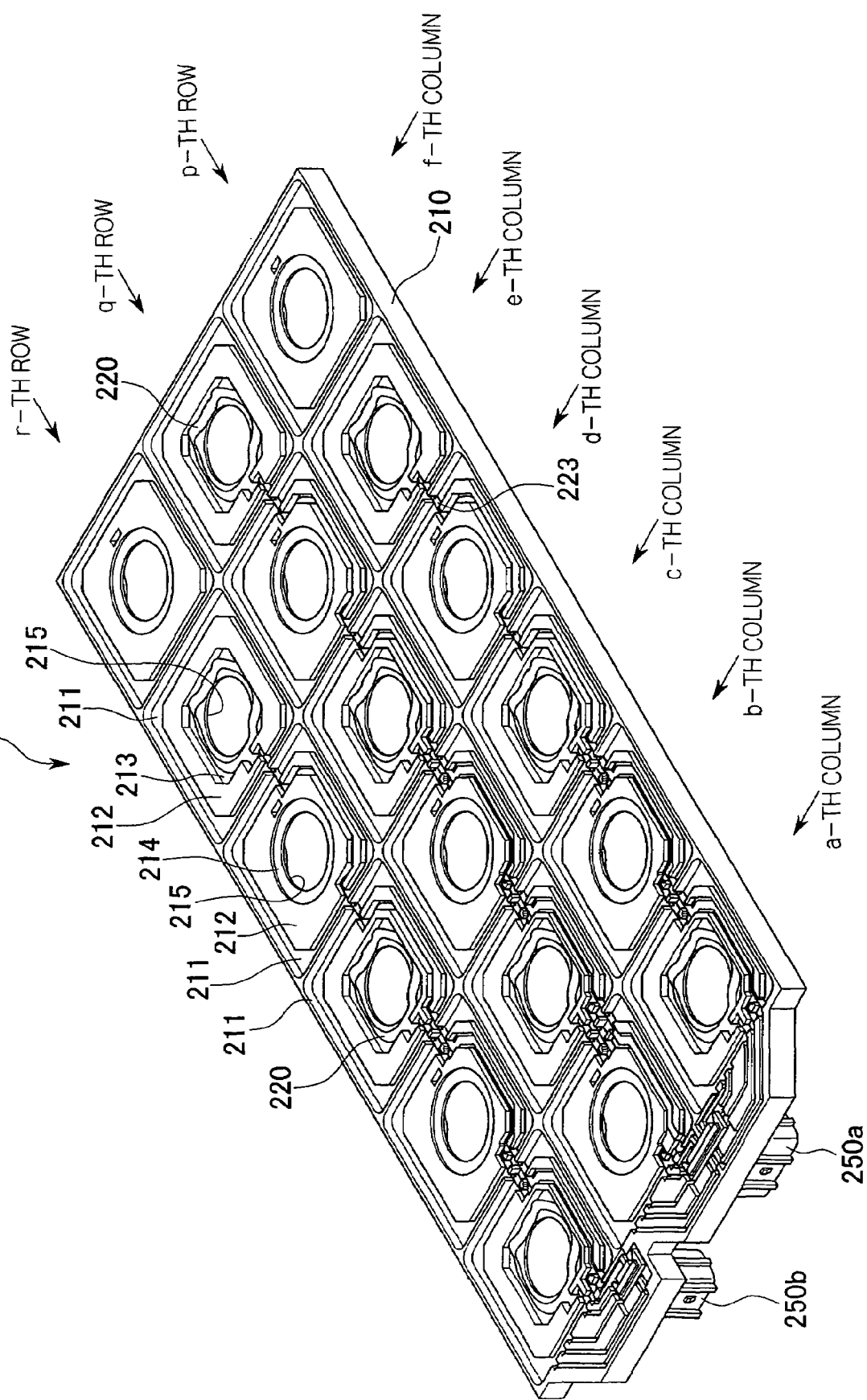
FIG. 28 is an external perspective view of an intermediate plate in the capacitor device.
Figure 29:
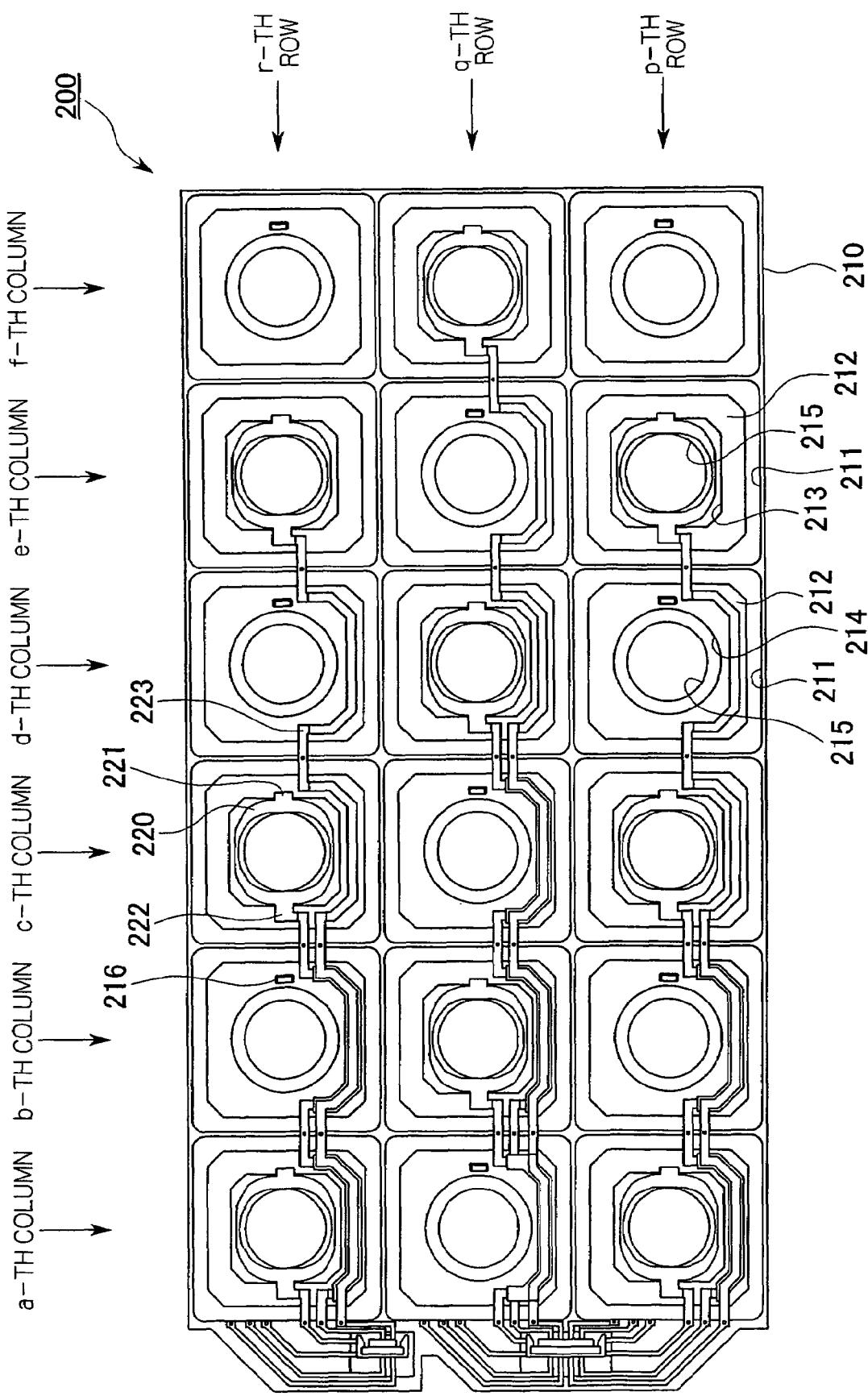
FIG. 29 is a plan view of the intermediate plate shown in FIG. 28.
Figure 30:
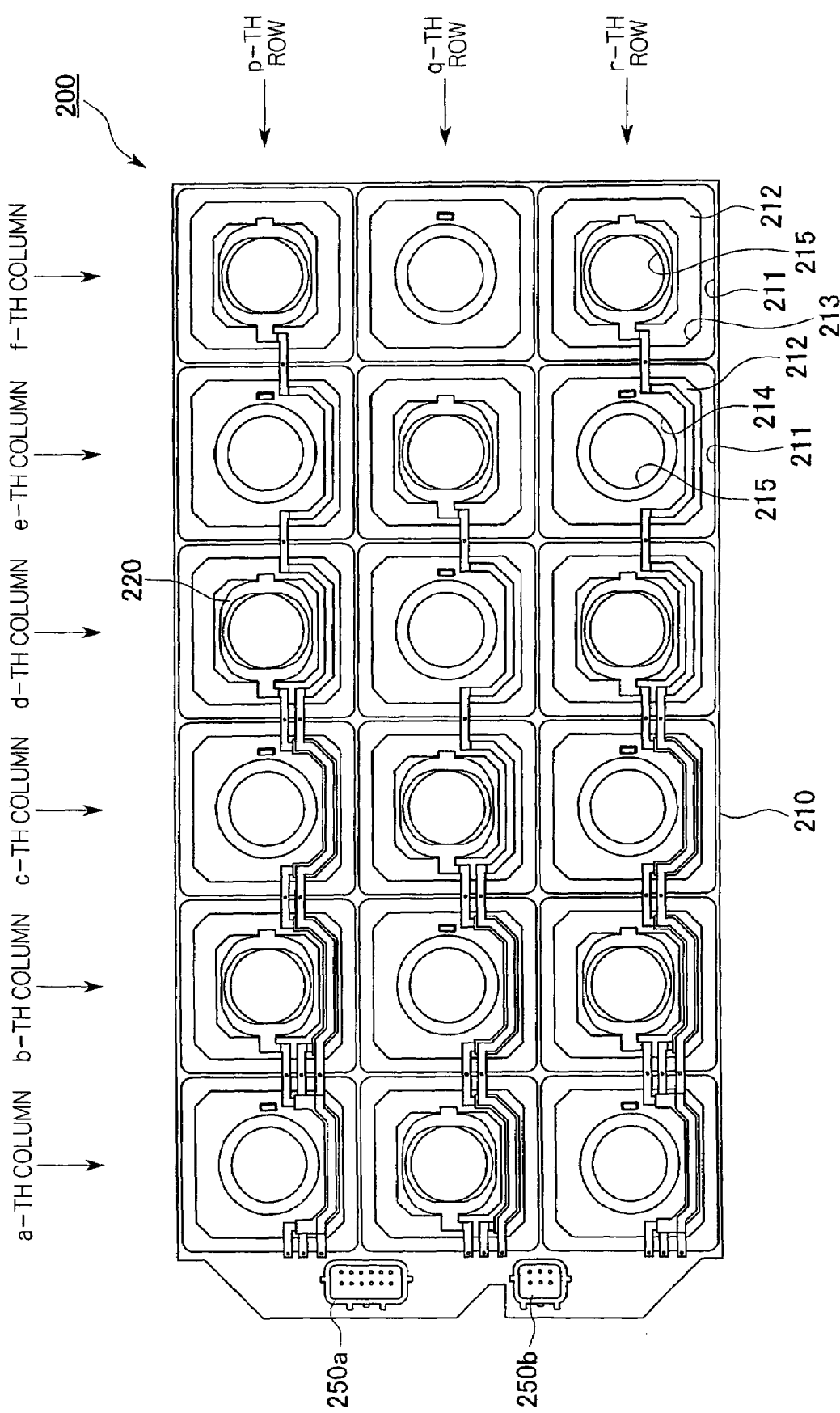
FIG. 30 is a bottom view of the intermediate plate shown in FIG. 28.
Figure 31:
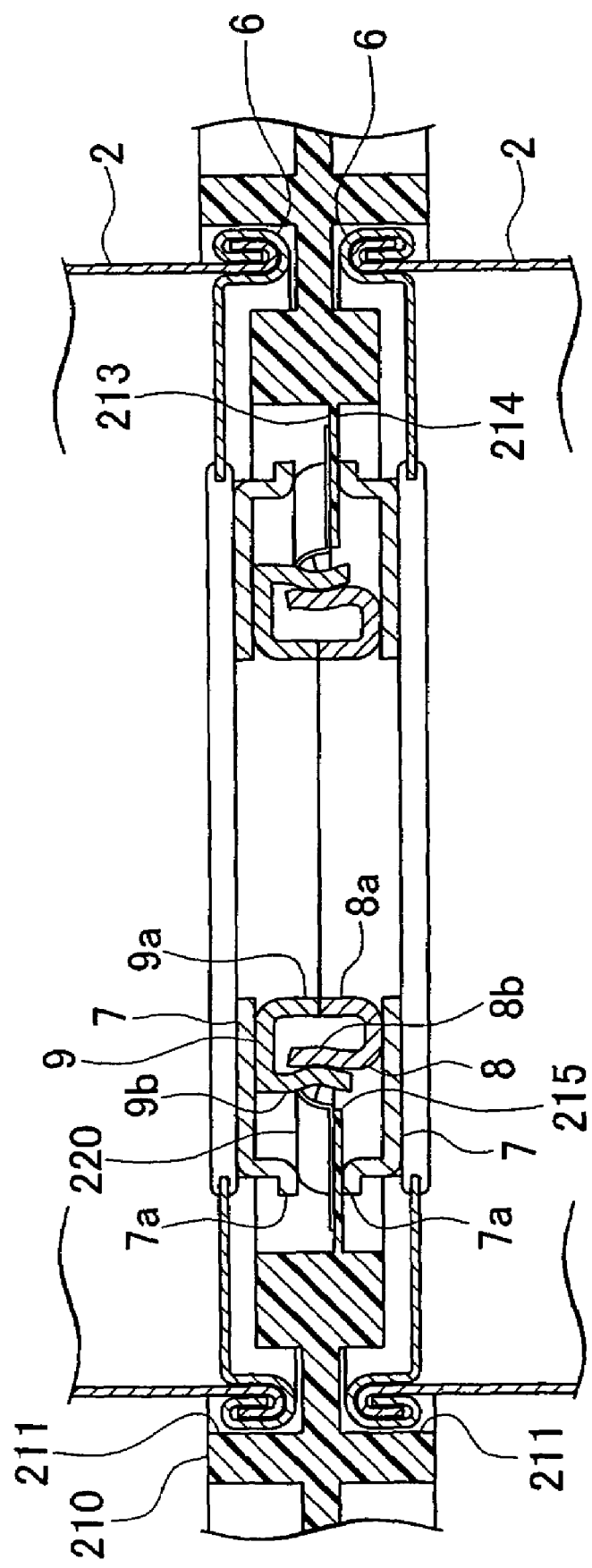
FIG. 31 is a sectional view showing a state in which two capacitors are directly connected across the intermediate plate.

Next, the intermediate plate 200 will be described. FIG. 28 is an external perspective view of the intermediate plate 200, FIG. 29 is a plan view of the intermediate plate 200, FIG. 30 is a bottom view of the intermediate plate 200, and FIG. 31 is a sectional view in a state in which the two capacitors 2 and 2 are connected across the intermediate plate 50.

The intermediate plate 200 mainly includes a frame 210 made of resin, 18 terminal bodies (voltage detecting terminals) 220 made of a conductive metal (for example, copper), and connectors 250a and 250b.

The frame 210 has a roughly rectangular shape in plan view, and on both front and back surfaces of the frame 210, 18 of concave portions 211, 211 . . . having roughly rectangular shapes in plan view are provided in total in 3 rows and 6 columns in a lattice pattern, and the concave portions 211 on the front surface side and the concave portions 211 on the back surface side are arranged at the same positions in plan view. The concave portion 211 is for inserting the frame portion 6 of the capacitor 2 and positioning the capacitor 2, and is formed into a size slightly larger than the frame portion 6.

On the frame 210, thick portions 212 in roughly rectangular shapes in plan view are provided at the centers of the respective concave portions 211, and at the center of one of the front and back surfaces of the thick portion 212, an inward concave portion 213 with a roughly rectangular shape in plan view is formed, and at the center of the other surface, an inward concave portion 214 with a roughly circular shape in plan view is formed, and at the centers of these inward concave portions 213 and 214, circular holes 215 perforating to the front and back surfaces are formed. The inward concave portions 213 and 214 are alternately arranged on the front and back surfaces of the frame 210 as shown in FIG. 29 and FIG. 30. The dimension between the centers of two of the holes 215 and 215 adjacent to each other matches the dimension between the centers of the positive terminal 8b and the negative terminal 9b in two capacitors 2 and 2 that are connected thereto and arranged in parallel to each other.

As shown in FIG. 31, the hole 215 is for making the fitting portion between the positive terminal 8b and the negative terminal 9b penetrate through it when connecting two of the capacitors 2 and 2 in series, and the inner diameter of the hole 215 is set to be a predetermined size larger than the outer diameter of the negative terminal 9b. The inward concave portion 213 with a roughly rectangular shape in plan view is a portion as an attaching seat for the terminal body 220, and is set to a size that can accommodate the terminal body 220. Furthermore, the inward concave portion 214 with a circular shape in plan view is a portion that allows the flange 7a of the capacitor 2 to seat on, and is set to a size that can accommodate the flange 7a.

At the end on the a-th column side of the back surface of the frame 210, connectors 250a and 250b that project in a direction separate from the upper plate 100 (downward) are provided.

The terminal bodies 220 are attached to the inward concave portions 213 on the front and back surfaces of the frame 210. The terminal body 220 is made of a conductive metal (for example, copper) and has a roughly circular shape in plan view, and is bent so as to become wavy in the plate thickness direction and performs a function as a leaf spring. The terminal body 220 has a pair of arms 221 and 222 at portions spaced from each other by 180 degrees circumferentially, and the terminal body is fixed to the frame 210 by fitting one arm 221 into a slit 216 formed in the inward concave portion 213 of the frame 210 and placing the other arm 222 in the inward concave portion 213.

The arms 222 of the respective terminal bodies 220 are connected to the connectors 250a and 250b via tabular leads 223 wired along the grooves on the front and back surfaces of the frame 210. Herein, the terminal bodies 220 arranged on the p-th row and the q-th row are connected to the connector 250a, and the terminal bodies 220 arranged on the r-th row are connected to the connector 250b. The leads 223 are covered by silicone rubber filled in the grooves for waterproofing.

As shown in FIG. 31, the inner diameter of the terminal body 220 is set so that the negative terminal 9b of the capacitor 2 can penetrate it, and the outer diameter of the terminal body 220 is set to a size that makes the terminal body 220 sandwiched between the flanges 7a and 7a of the dish members 7 and 7 of the capacitors 2 and 2 via the inward concave portions 213 and 214 of the frame 210 when the positive terminal 8b and the negative terminal 9b of the two capacitors 2 and 2 are inserted into the inner side of the terminal body 220 and fitted, and the waving height of the terminal body 220 (the height of the bent portion) is set so that the terminal body 220 is compressed by the flanges 7a and 7a via the inward concave portions 213 and 214 of the frame 210 when the positioning projections 8a and 9a of the two capacitors 2 and 2 are butted against each other.

Figure 32:
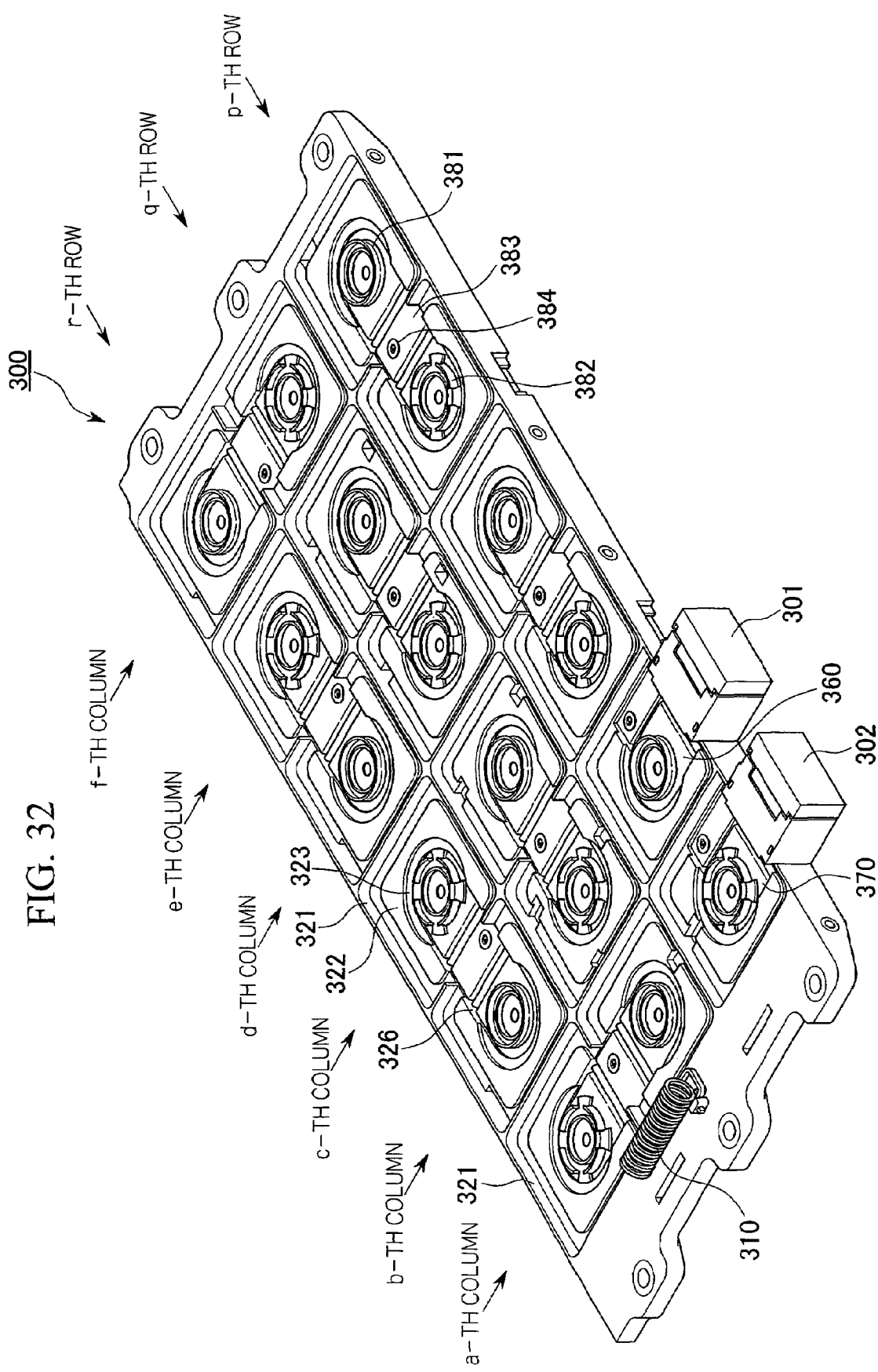
FIG. 32 is an external perspective view of a lower plate in the capacitor device.

Next, a lower plate 300 will be described. FIG. 32 is an external perspective view of the lower plate 300, FIG. 33 is a plan view of the lower plate 300, FIG. 34 is a perspective view of the lower plate 300 from which a second frame 350 is removed, in a state in which the bottom surface is turned upward, and FIG. 35 is a sectional view taken along the line I-I of FIG. 33.

The lower plate 300 is formed into a plate-shaped body with a roughly rectangular shape in plan view and mainly includes an input side connector 301, an output side connector 302, a voltage detecting connector 310, a first frame 320 and second frame 350 made of resin, and 10 bus bars (connecting members) 360, 370, and 380A through 380H made of a conductive metal (for example, copper), and the bus bars 360, 370, and 380A through 380H are attached onto the upper surface of the first frame 320, and the resin-made second frame 350 (shown in FIG. 20) is fitted and fixed to the bottom surface of the first frame 320.

Figure 34:
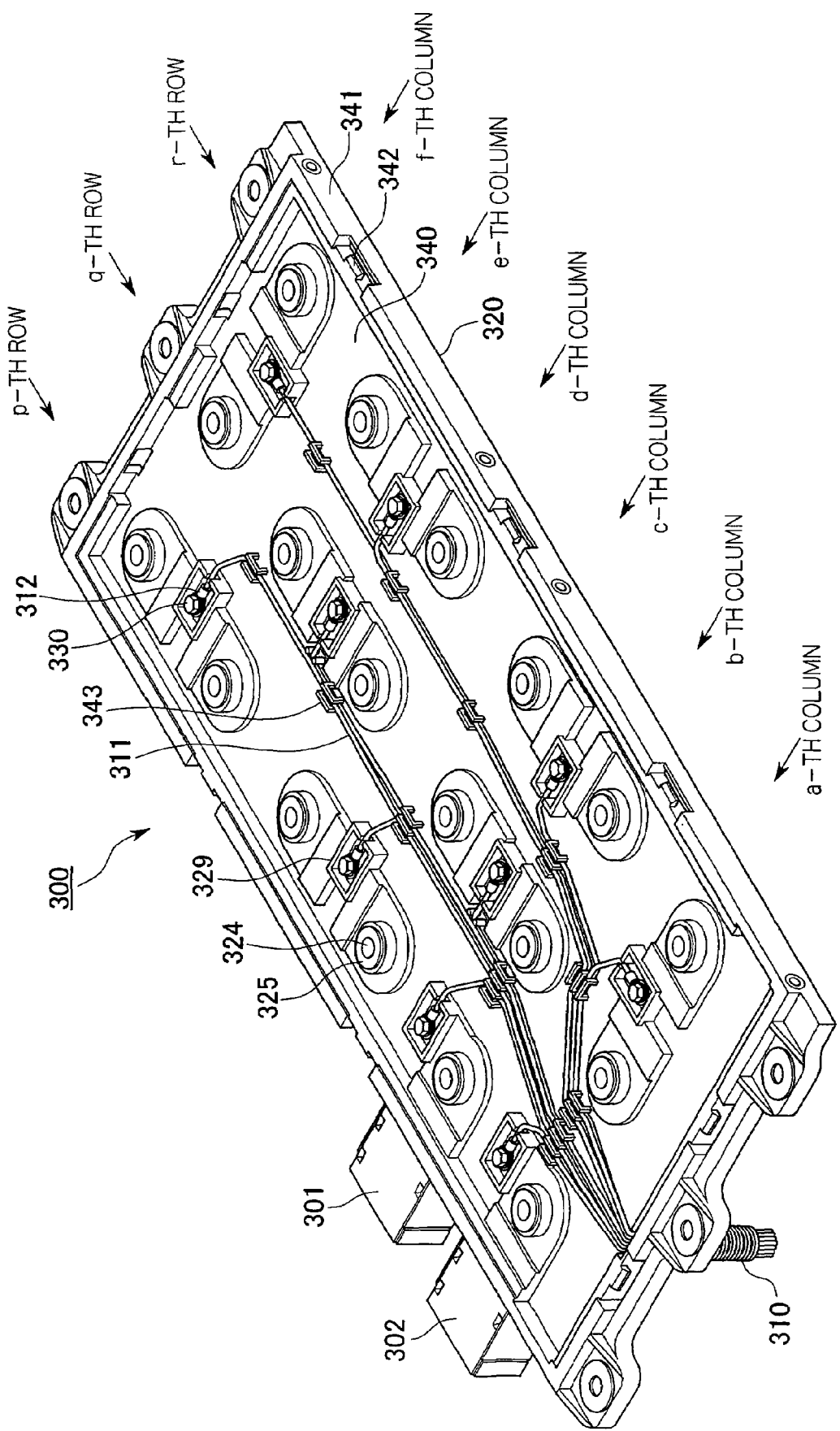
FIG. 34 is a perspective view of the lower plate shown in FIG. 32 in a state in which a part of the construction is removed, by turning the bottom surface of the lower plate up.
Figure 35:
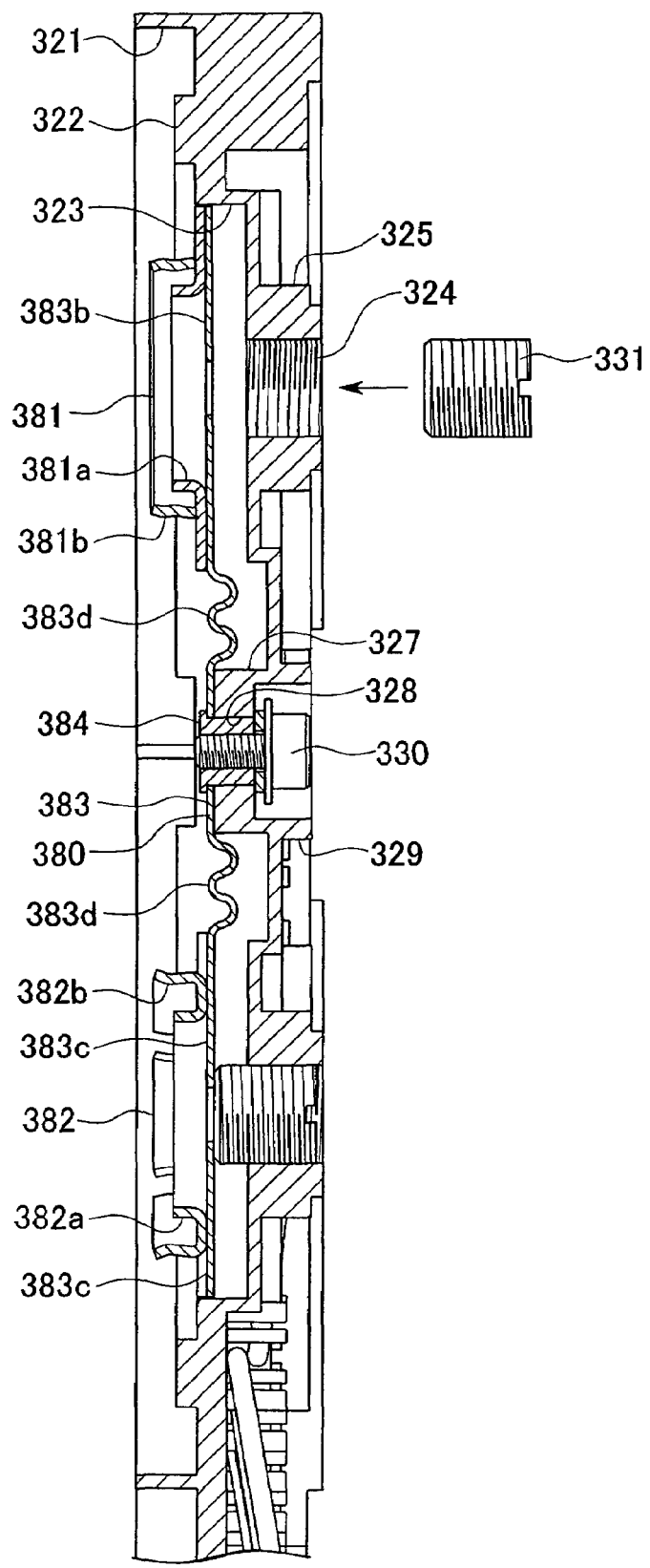
FIG. 35 is a sectional view taken along the line I-I of FIG. 33.

As shown in FIG. 34, on the bottom surface of the first frame 320, a concave portion 340 in which the second frame 350 is fitted is formed, and at predetermined portions of a peripheral wall 341 of the first frame 320, engaging claws 342 for fixing the second frame 350 are formed.

Figure 33:
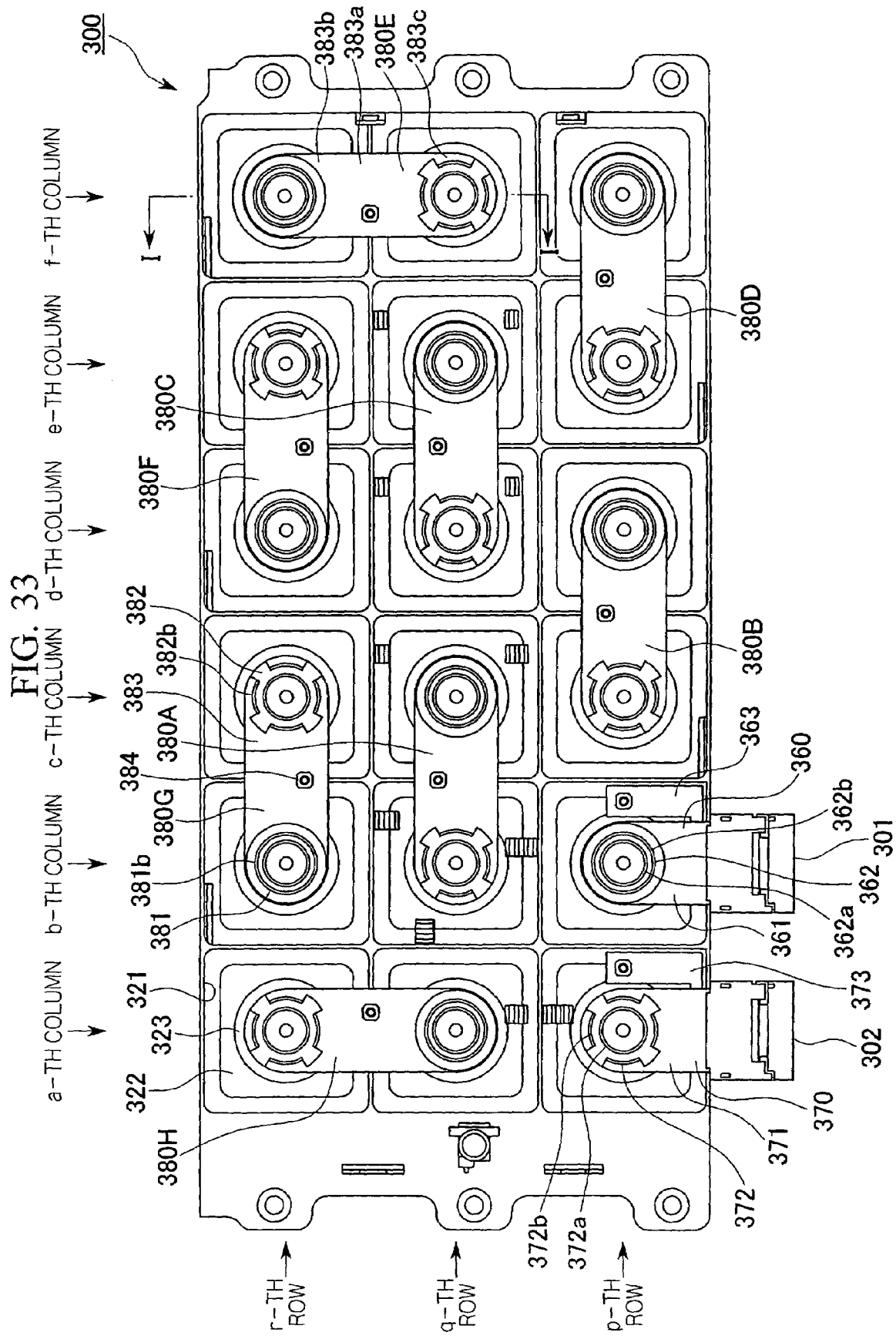
FIG. 33 is a plan view of the lower plate shown in FIG. 32.

As shown in FIG. 33, on the upper surface of the first frame 320, 18 of concave portions 321, 321 . . . having rectangular shapes in plan view are provided in total in 3 rows and 6 columns in a lattice pattern. The concave portions 321 are for inserting the frame portions 6 of the capacitors 2 and positioning the capacitors 2, and are formed into a size slightly larger than the frame portions 6. At the centers of the concave portions 321, projecting portions 322 having roughly rectangular shapes in plan view are projectedly provided, and at the centers of the concave portions, inward concave portions 323 with circular shapes in plan view are formed, and at the centers of the inward concave portions 323, screw holes 324 are perforated. Cylindrical peripheral walls 325 surrounding the screw holes 324 project to the concave portion 340 on the bottom surface of the first frame 320.

The inward concave portions 323 and 323 that are adjacent to each other and paired together are connected by a communicating concave portion 326. The combinations of the inward concave portions 323 and 323 to be connected and paired by the communicating concave portions 326 in this embodiment are of p-th row in c-th column and p-th row in d-th column, p-th row in e-th column and p-th row in f-th column, q-th row in a-th column and r-th row in a-th column, q-th row in b-th column and q-th row in c-th column, q-th row in d-th column and q-th row in e-th column, q-th row in f-th column and r-th row in f-th column, r-th row in b-th column and r-th row in c-th column, and r-th row in d-th column and r-th row in e-th column. Therefore, the inward concave portion 323 on p-th row in a-th column and the inward concave portion 323 on p-th row in b-th column do not communicate with each other, and are independent from each other.

In each communicating concave portion 326, at a position that is displaced from the center line connecting the two screw holes 324 and 324 and equidistant from the screw holes 324 and 324, a bus bar supporting portion 327 with a rectangular shape in plan view in which a rectangular hole 328 is perforated at the center is projectedly provided. On the concave portion 340 on the bottom surface of the first frame 320, a peripheral wall 329 with a rectangular shape in plan view arranged so as to surround this hole 328 is projectedly provided.

Next, the input side connector 301, the output side connector 302, and the bus bars 360, 370, and 380A through 380H will be described. The input side connector 301 is provided on a side surface of the first frame 320 adjacent to the concave portion 321 on p-th row in b-th column, and the output side connector 302 is provided on a side surface of the first frame 320 adjacent to the concave portion 321 on p-th row in a-th column.

The eight bus bars 380A through 380H (hereinafter, referred to as bus bars 380 when it is not necessary to distinguish the individual bus bars) are laid across two concave portions 321 and 321 adjacent to each other communicated by the communicating concave portions 326 in the first frame 320.

The bus bar 380 includes a male terminal body 380, a female terminal body 382, and a connecting plate 383 that connects these male terminal body 381 and female terminal body 382.

Figure 36:
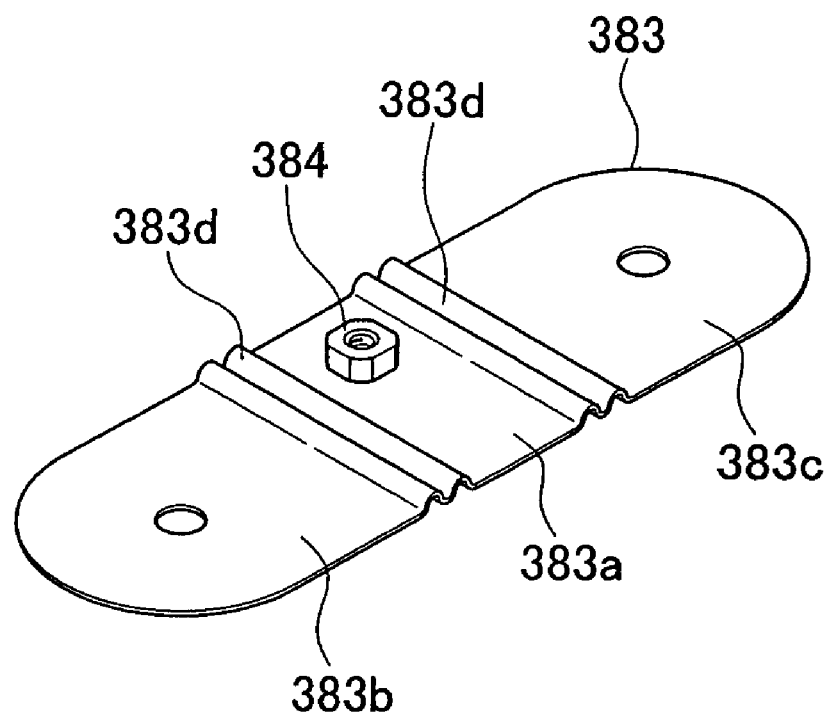
FIG. 36 is an external perspective view of a bus bar on the lower plate.
Figure 37:
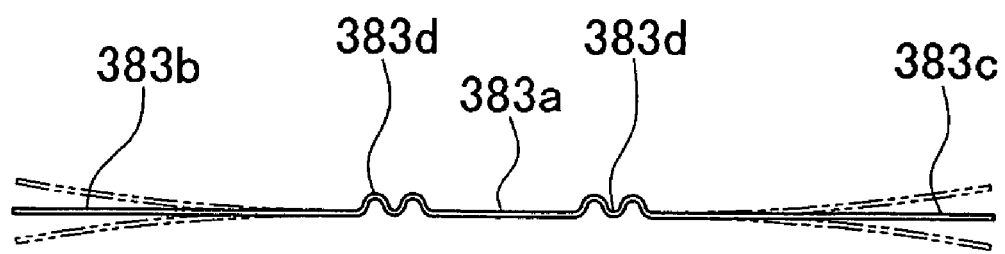
FIG. 37 is a side view for explaining flexibility of the bus bar shown in FIG. 36.

At the center of the connecting plate 383, as shown in FIG. 36, a supporting portion 383a is formed, and terminal attaching portions 383b and 383c are formed on both sides of the supporting portion 383a, and between the supporting portion 383a and the respective terminal attaching portions 383b and 383c, easily bending portions 383d with roughly W-shaped sections projecting toward the back surface side of the connecting plate 383 are formed. By providing the easily bending portions 383d, as shown in FIG. 37, the terminal attaching portions 383b and 383c of the connecting plate 383 are made easy to bend with respect to the supporting portion 383a.

The male terminal body 381 and the female terminal body 382 are welded to the front surface sides of the terminal attaching portions 383b and 383c, respectively. The male terminal body 381 is exactly the same as the male terminal body 151 of the bus bar 150 attached to the upper plate 100, and has a projection 381a and a male terminal 381b. The female terminal body 382 is exactly the same as the female terminal body 152 of the bus bar 150 attached to the upper plate 100, and has a projection 382a and a female terminal 382b. The dimension between the centers of the male terminal 381b and the female terminal 382b matches the dimension between the centers of the positive terminal 8b and the negative terminal 9b in two capacitors 2 and 2 that are connected thereto and arranged in parallel to each other.

In the supporting portion 383a, at a position that is displaced from the center line connecting the center of the male terminal 381b and the center of the female terminal 382b and is equidistant from the center of the male terminal 381b and the center of the female terminal 382b, a square nut 384 is penetrated and fixed and projects by a predetermined dimension from the back surface of the supporting portion 383a.

The bus bar 380 is attached to the first frame 320 by disposing the supporting portion 383a at the bus bar supporting portion 327 of the first frame 320, inserting the square nut 384 into the hole 328 of the bus bar supporting portion 327, and screwing a bolt 330 disposed within the peripheral wall 329 on the upper surface side of the first frame 320 into the square nut 384. At this time, the positions of the male terminal 381b and the female terminal 382b are uniquely determined by the engagement between the square nut 384 and the hole 328, so that the attaching positions of the male terminal 381b and the female terminal 382b are not get erroneous. In this attaching state of the bus bar 380, the male terminal 381b and the female terminal 382b are positioned at the center of each concave portion 321 in the first frame 320, and the center on the back surface side of the terminal attaching portion 383b or 383c and the screw hole 324 of the first frame 320 are positioned coaxially with each other.

As shown in FIG. 35, in the screw hole 324 of the first frame 320, a rod-shaped screw 331 made of an insulating resin is screwed from the bottom surface side, and the tip end of this screw 331 projects from the bottom of the inward concave portion 323 and is butted against the terminal attaching portion 383b or 383c of the bus bar 380.

As described above, the terminal attaching portions 383b and 383c of the bus bar 380 have flexibility with respect to the supporting portion 383a, so that by changing the dimension of the screw 331 projecting from the bottom of the inward concave portion 323, the height positions of the male terminal 381b and the female terminal 382b with respect to the first frame 320 can be changed.

The bus bar 360 includes a terminal plate 361, a male terminal body 362 welded to one end side of the terminal plate 361, and an attaching arm 363 fixed to the terminal plate 361. The male terminal body 362 is exactly the same as the male terminal body 151 of the bus bar 150 attached to the upper plate 100, and has a projection 362a and a male terminal 362b. On the terminal plate 361, an easily bending portion (not shown) similar to the easily bending portion 383d of the bus bar 380 is formed, whereby the side to which the male terminal body 362 is attached is made to easily bend. The male terminal body 362 of the bus bar 360 is disposed at the center of the concave portion 321 on p-th row in b-th column, and the bus bar 360 is fixed to the first frame 320 via the attaching arm 363 with bolts in the same manner as the bus bar 380. The other end side of the terminal plate 361 is inserted into the input side connector 301, and the other end of this terminal plate 361 functions as an input terminal of the capacitor device 1B.

The bus bar 370 includes a terminal plate 371, a female terminal body 372 welded to one end side of the terminal plate 371, and an attaching arm 373 fixed to the terminal plate 371. The female terminal body 372 is exactly the same as the female terminal body 152 of the bus bar 150 attached to the upper plate 100, and has a projection 372a and a female terminal 372b. On the terminal plate 371, an easily bending portion (not shown) similar to the easily bending portion 383d of the bus bar 380 is formed, whereby the side to which the female terminal body 372 is attached is made to easily bend. The female terminal body 372 of the bus bar 370 is disposed at the center of the concave portion 321 on p-th row in a-th column, and the bus bar 370 is fixed with bolts to the first frame 320 via the attaching arm 373 in the same manner as the bus bar 380. The other end side of the terminal plate 371 is inserted into the output side connector 302, and the other end of the terminal plate 371 functions as an output terminal of the capacitor device 1B.

In the concave portion 340 on the bottom surface of the first frame 320, harnesses 311, 311 . . . that connect a voltage detecting connector 310 and bus bars 360, 370, and 380A through 380H are wired as predetermined along wiring hooks 343 provided on the concave portion 340, and the connecting terminals 312, 312 . . . of the harnesses 311, 311 . . . are fastened with bolts 330 that fix the bus bars 360, 370, and 380A through 380H, and are electrically connected.

In the second frame 350, at portions corresponding to the centers of the male terminals 381b and the female terminals 382b of the first frame 320 when attached to the first frame 320, work holes (not shown) that enable insertion of a screwdriver are formed. As shown in FIG. 20, the work holes are closed by caps 351. The second frame 350 is fixed to the first frame 320 by being inserted into the concave portion 340 on the bottom surface of the first frame 320 and engaging the engaging claws 342 of the first frame 320 with engaging holes (not shown) formed in the second frame 350.

Next, procedures for assembling this capacitor device 1B will be described. In the lower plate 300 before assembling, the tip ends of all screws 331 are separated from the bus bars 360, 370, and 381A through 380H, and the caps 351 are not attached to the work holes.

First, the upper plate 100 is placed on a work table (not shown) by turning the cover 130 downward. At this time, only the hill portions 133a and 133b positioned highest in the cover 130 come into contact with the work table.

Then, while inserting the frame portions 6 of the capacitors 2 into the concave portions 112 of the first frame 110, the negative terminals 9b or positive terminals 8b of the capacitors 2 are fitted to the male terminals 151b or female terminals 152b of the bus bars 150 are exposed from the first frame 110, whereby 18 of the capacitors 2, 2 . . . on the upper stage are attached to the upper plate 100. At this time, the capacitors 2 are pushed in until the projections 151a and 152a of the bus bars 150 are butted against the positioning projections 8a and 9a of the capacitors 2. The positions in the axial direction of the capacitors 2 with respect to the upper plate 100 are determined by the butting of the projections 151a and 152a and the positioning projections 8a and 9a, whereby the fitting state between the male terminals 151b and the negative terminals 9b and the fitting state between the female terminals 152b and the positive terminals 8b become optimum. In addition, the frame portions 6 of the capacitors 2 are inserted into the concave portions 112 of the upper plate 100, so that the capacitors 2 can be easily positioned with respect to the upper plate 100, and the capacitors 2 are prevented from rotating. The positions in the axial direction of the capacitors 2 with respect to the upper plate 100 are determined by the butting of the projections 151a and 152a and the positioning projections 8a and 9a, so that the tip ends of the frame portions 6 of the capacitors 2 do not come into contact with the surfaces of the concave portions 112 of the upper plate 100.

However, the resin sheet 128 provided at the position where the thermistor 129 is installed in the upper plate 100 comes into close contact with the top plate 4 of the capacitor 2, whereby an electrical signal corresponding to the temperature of the capacitor 2 can be outputted to the capacitor temperature control circuit of the control board 140.

Then, connectors 400 and 410 are connected to the connector insertion ports 111b and 111c of the upper plate 100, respectively.

Next, on the 18 capacitors 2, 2 . . . on the upper stage attached to the upper plate 100, the intermediate plate 200 is disposed. At this time, the connector insertion ports 111a through 111c of the upper plate 100 and the connectors 250a and 250b of the intermediate plate 200 are disposed on the same side in the longitudinal direction of the plates 100 and 200, and the connectors 250a and 250b of the intermediate plate 200 are turned upward. Then, the frame portions 6 of the capacitors 2 on the upper stage are inserted into the concave portions 211 of the frame 210 of the intermediate plate 200. Thereby, the relative positions of the 18 capacitors 2, 2 . . . on the upper stage and the intermediate plate 200 can be easily and accurately determined, and after assembly, the capacitors 2 can be prevented from rotating.

Next, the 18 capacitors 2, 2 . . . on the lower stage are attached from the upper side of the concave portions 211 of the intermediate plate 200. At this time, while inserting the frame portions 6 of the capacitors 2 to be disposed on the lower stage into the concave portions 211 of the frame 210 of the intermediate plate 200, the negative terminals 9b and the positive terminals 8b of the capacitors 2 to be disposed on the lower stage are fitted to the positive terminals 8b or the negative terminals 9b of the capacitors 2 on the upper stage exposed from the frame 211, and the positioning projections 8a and 9a of the capacitors 2 and 2 on the upper and lower stages are pushed-in until they are butted against each other.

The frame portions 6 of the capacitors 2 on the lower stage are inserted into the concave portions 211 of the intermediate plate 200, so that the capacitors 2 can be easily positioned with respect to the intermediate plate 200, and the capacitors 2 can be prevented from rotating after assembly.

FIG. 31 is a drawing showing a state in which the capacitors 2 and 2 on the upper and lower stages are joined to each other, and the fitting portions between the positive terminals 8b and the negative terminals 9b penetrate the terminal bodies 220 of the intermediate plate 200, and the inward concave portions 214 and the terminal bodies 220 of the intermediate plate 200 are sandwiched between the flanges 7a and 7a of the capacitors 2 and 2 on the upper and lower stages. As a result, the terminal bodies 220 are sandwiched and compressed between the flanges 7a and 7a of the capacitors 2 and 2 on the upper and lower stages via the inward concave portions 214, and the capacitors 2 and 2 on the upper and lower stages are electrically connected to the terminal bodies 220 without fail.

The relative positions in the axial direction of the two capacitors 2 and 2 connected in series are determined by butting the positioning projections 8a and the positioning projections 9a against each other, whereby the fitting states between the positive terminals 8b and the negative terminals 9b become optimum. Therefore, the frame portions 6 of the capacitors 2, 2 on the upper and lower stages are all only inserted into the concave portions 211 of the intermediate plate 200, and the tip ends of the frame portions 6 do not come into contact with the surfaces of the concave portions 211 of the intermediate plate 200.

Then, the connector 400 is connected to the connector 250b of the intermediate plate 200 and the connector 410 is connected to the connector 250a of the intermediate plate 200. Thereby, the 18 terminal bodies 220 of the intermediate plate 200 are electrically connected to the capacitor voltage detecting circuit of the control board 140 installed inside the upper plate 100.

Next, the lower plate 300 is disposed on the 18 capacitors 2, 2 . . . on the lower stage.

At this time, the lower plate 300 is disposed so that the connector insertion ports 111a through 111c of the upper plate 100 and the voltage detecting connector 310 of the lower plate 300 come to the same side in the longitudinal direction of the plates 100 and 300. Then, the frame portions 6 of the capacitors 2 on the lower stage are inserted into the concave portions 321 of the first frame 320 of the lower plate 300. Thereby, the relative positions of the 18 capacitors 2, 2 . . . on the lower stage and the lower plate 300 can be easily and accurately determined, and simultaneously, the female terminals 372b and 382b of the lower plate 300 can be disposed coaxially with the positive terminals 8b of the capacitors 2 on the lower stage, and the male terminals 362b and 381b of the lower plate 300 can be disposed coaxially with the negative terminals 9b of the capacitors 2 on the lower stage. After assembly, the capacitors 2 on the lower stage can be prevented from rotating.

In this state, the lower plate 300 is entirely pushed downward. Thereby, to the positive terminals 8b of the capacitors 2 on the lower stage, corresponding female terminals 372b or 382b in the lower plate 300 can be fitted, and to the negative terminals 9b of the capacitors 2 on the lower stage, corresponding male terminals 362b or 381b in the lower plate 300 can be fitted.

When fitting the negative terminals 9b or positive terminals 8b of the capacitors 2 to the male terminals 151b or the female terminals 152b of the bus bars 150 of the upper plate 100, when fitting the positive terminals 8b and the negative terminals 9b of capacitors 2 and 2 on the upper and lower stages, when fitting the female terminals 372b and 382b of the lower plate 300 to the positive terminals 8b of the capacitors 2 on the lower stage, and when fitting the male terminals 382b and 381b of the lower plate 300 to the negative terminals 9b of the capacitors 2 on the lower stage, a great vertically pushing-in force is necessary, however, in this capacitor device 1B, the tip ends of the bosses 173 of the bus bar covers 170 have been butted against the inner surface of the top plate 132 of the cover 130 and the bosses 173 of the bus bar covers 170 have been inserted with play in the holes 141 of the control board 140, so that the pushing-in force is transmitted to the work table via the capacitors 2 on the upper stage, the bus bars 150, the bus bar covers 170, and the cover 130, and is hardly transmitted to the control board 140. Therefore, an impact on the control board 140 can be avoided, whereby the control board 140 can be protected.

In a service condition after completion of assembly, the same function can be obtained even when a force in the axial direction of the capacitors 2 is applied to the cover 130 or the lower plate 300, whereby the control board 140 can be protected from the force and an impact.

The capacitors 2 have a height tolerance, and when connecting the capacitors 2 in series vertically, the tolerance of the total height after connection becomes twice. Particularly, when a number of capacitor groups connected vertically as in this capacitor device 1B are two-dimensionally arranged, due to the dimensional tolerance in the height direction of the capacitor groups vertically connected, the fitting state between the positive terminals 8b and the female terminals 372b and 382b and the fitting state between the negative terminals 9b and the male terminals 382b and 381b may become improper. However, in the case of this capacitor device 1B, the terminal plates 361 and 371 of the bus bars 360 and 370 of the lower plate 300 and the connecting plates 383 of the bus bars 380A through 380H are provided with flexibility, so that the dimensional tolerance in the height direction of the capacitor groups connected vertically can be absorbed, and the fitting state between the positive terminals 8b and the female terminals 372b and 382b and the fitting state between the negative terminals 9b and the male terminals 362b and 381b can be always properly adjusted. This adjustment can be made by screwing the screws 331 attached to the first frame 320 with a screwdriver inserted into the work holes made in the second frame 350 of the lower plate 300. When screwing the screws 331, at the tip ends of the screws 331, the terminal plates 361 and 371 of the bus bars 360 and 370 or the terminal attaching portions 383b and 383c of the connecting plates 383 of the bus bars 380A through 380H can be pushed downward, whereby the fitting state between the positive terminals 8b and the female terminals 372b and 382b and the fitting state between the negative terminals 9b and the male terminals 362b and 381b can be made proper.

Thereafter, the voltage detecting connector 310 of the lower plate 300 is connected to the connector insertion port 111a of the upper plate 100. Thereby, the 10 bus bars 360, 370, and 380A through 380H of the lower plate 300 are electrically connected to the capacitor voltage detecting circuit of the control board 140 installed inside the upper plate 100. Then, the assembly of the capacitor device 1B is completed.

In the capacitor device 1B thus constructed, all 36 of the capacitors 2, 2 . . . are connected in series, so that a very high voltage can be obtained. In detail, the capacitor 2 on p-th row in b-th column on the lower stage is connected to the bus bar 360 joined to the input side connector 301, and to this capacitor 2, the capacitor 2 on p-th row in b-th column on the upper stage is connected. This capacitor 2 on p-th row in b-th column on the upper stage is connected to the capacitor 2 on q-th row in b-th column on the upper stage via the bus bar 150 of the upper plate, and this capacitor 2 on q-th row in b-th column on the upper stage is connected to the capacitor 2 on q-th row in b-th column on the lower stage. This capacitor 2 on q-th row in b-th column on the lower stage is connected to the capacitor 2 on q-th row in c-th column on the lower stage via the bus bar 380A of the lower plate 300, and this capacitor 2 on q-th row in c-th column on the lower stage is connected to the capacitor 2 on q-th row in c-th column on the upper stage. In the same manner, while capacitors 2 and 2 on the upper and lower stages are connected in series, the capacitors 2 are successively connected to capacitors on adjacent rows or in adjacent columns in series, and the capacitor 2 on p-th row in a-th column on the lower stage becomes the terminal end, and this capacitor 2 is connected to the output side connector 302 via the bus bar 370.

Then, as described above, the 9 bus bars 150, 150 . . . of the upper plate 100, the 10 bus bars 360, 370, and 380A through 380H of the lower plate 300, and the 18 terminal bodies 220, 220 . . . of the intermediate plate 200 are electrically connected to the capacitor voltage detecting circuit of the control board 140 installed inside the upper plate 100, so that not only can the total voltage of the capacitor device 1B be detected but also the voltages or the like of the individual capacitors 2 and the voltages, etc., of the groups connecting predetermined numbers of the capacitors 2 can be detected as appropriate. Therefore, a precise voltage control of the capacitor device 1B can be achieved.

In addition, in this capacitor device 1B, the capacitors 2 are positioned and prevented from rotating by disposing the intermediate plate 200 between the 18 capacitors 2, 2 . . . on the upper stage and the 18 capacitors 2, 2 . . . on the lower stage, so that even after completion of the assembly, the relative positional relationship among the capacitors 2 is not altered, whereby the form can be stabilized. The capacitors 2, 2 on the upper stage and the capacitors 2, 2 . . . on the lower stage are also positioned and prevented from rotating with respect to the upper plate 100 and the lower plate 300, so that even after completion of the assembly, the relative positional relationship among the capacitors 2 is not altered, and the form can be stabilized.

In addition, the entirety of the 36 capacitors 2, 2 . . . are not covered by a casing, but the 36 capacitors 2, 2 . . . are sandwiched and held between the upper plate 100 and the lower plate 300, so that the capacitor device 1B can be reduced in size and weight.

Other Embodiments

The invention is not limited to the embodiments described above.

For example, in the first embodiment and the second embodiment, the number of connecting stages of the capacitors 2 along the axial direction is two, however, three or more stages are also possible, and in this case, the intermediate plate is disposed between the capacitors 2 on the n-th stage and the capacitors 2 on the (n+1)-th stage.

In the second embodiment, 18 capacitors 2 are arranged in three rows and six columns on each stage, however, the number of capacitors 2 on each stage and the arrangement form thereof are not limited to this. For example, it is also possible for 12 total capacitors 2 to be arranged in one row and six columns on the respective upper and lower stages in the capacitor device 1B of the second embodiment.

What is claimed is:

1. A capacitor device comprising:
a plurality of capacitor elements, each of which has a first terminal on one end side and a second terminal on the other end side in an axial direction, and which are plurally arranged along the axial direction and plurally arranged along a direction crossing the axial direction;
an upper plate disposed so as to be joined to one end portion in the axial direction of each of the plurality of capacitor elements arranged along the axial direction;
a lower plate disposed so as to be joined to the other end portion in the axial direction of each of the plurality of capacitor elements arranged along the axial direction; and
an intermediate plate disposed between the capacitor elements adjacent to each other along the axial direction, wherein
the capacitor elements adjacent to each other along the axial direction are electrically connected to each other by fitting between the first terminal of one capacitor element and the second terminal of the other capacitor element,
the intermediate plate allows the terminals fitted to each other between the capacitor elements adjacent to each other along the axial direction to penetrate through and positions these capacitor elements,
the upper plate is electrically connected to the first terminals or the second terminals of the capacitor elements arranged on one end portion in the axial direction,
the lower plate is electrically connected to the first terminals or the second terminals of the capacitor elements arranged on the other end portion in the axial direction, and
all of the plurality of capacitor elements are held in place by being sandwiched between the upper plate and the lower plate.

2. The capacitor device according to claim 1, wherein
on the upper plate and the lower plate, connecting members that electrically connect the capacitor elements adjacent to each other are provided, whereby all the capacitor elements are connected in series.

3. The capacitor device according to claim 1, wherein
On the intermediate plate, voltage detecting terminals to be connected to the terminals that penetrate the intermediate plate and are fitted to each other are provided.

* * * * *